US009869484B2

(12) United States Patent
Hester et al.

(10) Patent No.: US 9,869,484 B2
(45) Date of Patent: *Jan. 16, 2018

(54) PREDICTIVELY CONTROLLING AN ENVIRONMENTAL CONTROL SYSTEM

(71) Applicant: Google Inc., Mountain View, CA (US)

(72) Inventors: Todd Andrew Hester, San Francisco, CA (US); Evan Jarman Fisher, Palo Alto, CA (US); Piyush Khandelwal, Austin, TX (US)

(73) Assignee: Google Inc., Mountain View, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 14/597,198

(22) Filed: Jan. 14, 2015

(65) Prior Publication Data
US 2016/0201934 A1 Jul. 14, 2016

(51) Int. Cl.
F24F 11/00 (2006.01)
F24F 11/02 (2006.01)
G05B 17/02 (2006.01)

(52) U.S. Cl.
CPC ........ *F24F 11/006* (2013.01); *F24F 11/0012* (2013.01); *F24F 11/0086* (2013.01); *F24F 11/02* (2013.01); *G05B 17/02* (2013.01); *F24F 2011/0046* (2013.01); *F24F 2011/0047* (2013.01); *F24F 2011/0049* (2013.01); *F24F 2011/0058* (2013.01); *F24F 2011/0064* (2013.01); *F24F 2011/0068* (2013.01); *F24F 2011/0075* (2013.01); *F24F 2011/0094* (2013.01)

(58) Field of Classification Search
None
See application file for complete search history.

(56) References Cited

U.S. PATENT DOCUMENTS

| 8,600,561 | B1* | 12/2013 | Modi | F24F 11/0012 |
| | | | | 219/502 |
| 2012/0253527 | A1* | 10/2012 | Hietala | G05B 17/02 |
| | | | | 700/278 |
| 2013/0325377 | A1* | 12/2013 | Drees | G06Q 10/06 |
| | | | | 702/61 |
| 2015/0253027 | A1* | 9/2015 | Lu | F24F 11/006 |
| | | | | 700/276 |

\* cited by examiner

*Primary Examiner* — Paul Yanchus, III
(74) *Attorney, Agent, or Firm* — Kilpatrick Townsend & Stockton LLP

(57) ABSTRACT

In an embodiment, an electronic device may include a processor that may iteratively simulate candidate control trajectories using upper confidence bound for trees (UCT) to control an environmental control system (e.g., an HVAC system). Each candidate control trajectory may be simulated by selecting a control action at each of a plurality of time steps over a period of time that has the highest upper bound on possible performance using values from previous simulations and predicting a temperature for a next time step of the plurality of time steps that results from applying the selected control action using a thermal model. The processor may determine a value of each candidate control trajectory using a cost function, update the value of each control action selected in each candidate control trajectory, and select a candidate control trajectory with the highest value using UCT to apply to control the environmental control system.

25 Claims, 15 Drawing Sheets

PREDICTIVELY CONTROLLING AN ENVIRONMENTAL CONTROL SYSTEM

BACKGROUND

This disclosure relates to controlling an environmental control system to improve the energy efficiency and/or temperature comfort level provided by the environmental control system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Environmental control systems, such as heating, ventilation, and/or air conditioning (HVAC) systems, may manage a thermal environment of a structure, such as a residential or commercial building. Environmental control systems decide how to condition the structure properly, which may include varying an internal temperature, humidity, and/or other environmental characteristic. Since the structure has an associated thermal mass that needs to be heated or cooled, how and when the heating or cooling is carried out can greatly impact the energy efficiency as well as the temperature comfort level.

Generally, an environmental control system may be managed by a technique known as "bang-bang control." Bang-bang control refers to the process used to turn on or off the heating or cooling devices of the system to heat or cool the structure when the temperature of the structure falls outside a temperature band. For example, in a cooling scenario, bang-bang control may turn on a cooling device such as an air conditioning system when the structure is a certain number of degrees (e.g., ~0.5° C.) above a target temperature setpoint. Bang-bang control may turn off the cooling device when the temperature is a certain number of degrees (e.g., ~0.5° C.) below the target temperature set point. Bang-bang control, however, is not concerned with energy efficiency or providing a more comfortable environmental temperature beyond maintaining the temperature of the structure within the target temperature band.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

Various systems, methods, apparatus, and related computer programs for controlling an environmental control system using a predictive control to improve energy efficiency and a temperature comfort level provided by the environmental control system, among other things, are disclosed. In some embodiments, the environmental control system may include a heating, ventilating, and/or air conditioning (HVAC) system. It should be understood that improving the energy efficiency of the HVAC system may refer to reducing how long the HVAC system runs, how many cycles the HVAC system performs, the length of the cycles, and so forth. It should be further understood that the temperature comfort level may refer to how tightly fit the indoor temperature is maintained to a preferred temperature (e.g., near minimal difference). In some embodiments, the predictive control may include predicting temperatures using a model and possible control scenarios and applying the control scenario with the desired temperature predictions. The model may be dynamically generated based on the structure in which the HVAC system is installed, downloaded via an external source (e.g., online service), and/or preloaded and selected based on various factors (e.g., type of structure, size of structure, geographic location of structure, type of HVAC system, speed of HVAC system). The predictive control may include various predictive methods, including methods from the Monte Carlo Tree Search family (e.g., upper confidence bound for trees (UCT)). Further, the predictive control may include using a cost function to determine the value of each control scenario based on factors relating to at least efficiency of the HVAC system, wear and tear of the HVAC system, and a temperature comfort level. The predictive control may select the control scenario that generates the highest value and execute the selected control scenario on the HVAC system to control the indoor temperature accordingly.

In a first embodiment, a non-transitory computer readable medium storing instructions is disclosed. The instructions, when executed by a processor of an electronic device, may be configured to simulate control trajectories to control an environmental control system of a structure for a forthcoming period of time including selecting a control action at each of a plurality of time steps of the forthcoming period of time using upper confidence bound for trees (UCT), determine a value of each control trajectory using a cost function and update the value of each control action selected in each control trajectory, and select a control trajectory with the highest value as the control trajectory to apply to control the environmental control system.

In a second embodiment, a method may include simulating, via a processor, control trajectories to control an environmental control system of a structure for a forthcoming period of time using upper confidence bound for trees (UCT), wherein each control trajectory is simulated by selecting a control action to control the environmental control system at each of a plurality of time steps for the forthcoming period of time based on the highest upper bound on possible performance using rewards from previous simulations, determining, via the processor, a reward for each control trajectory, selecting, via the processor, a control trajectory with the highest reward as the control trajectory to apply to control the environmental control system.

In a third embodiment, a system may include an environmental control system and an electronic device. The electronic device may include a processor configured to control the environmental control system of a structure by applying a control trajectory, where the control trajectory is selected from a plurality of candidate control trajectories simulated using upper confidence bound for trees (UCT) based on having the highest value as determined by a cost function, each of the plurality of candidate control trajectories including a selected control action at each of a plurality of time steps over a period of time and a predicted temperature trajectory resulting from applying each control action at each of the plurality of time steps according to a thermal model of the structure.

In a fourth embodiment, an electronic device may include a power source configured to provide operational power to the electronic device and a processor coupled to the power source. The processor may be configured to iteratively simulate candidate control trajectories to control an environmental control system of a structure using upper confidence bound for trees (UCT), where each candidate control trajectory is simulated by selecting a control action to control the environmental control system at each of a plurality of time steps over a period of time that has the highest upper bound on possible performance using value estimates from previous simulations and predicting a temperature for a next time step of the plurality of time steps that results from applying the selected control action using a thermal model of the structure. The processor may also be configured to determine a value estimate of each candidate control trajectory using a cost function and update the value estimate of each control action selected in each candidate control trajectory, select a control trajectory with the highest value using UCT, and apply the selected candidate control trajectory to control the environmental control system.

In a fifth embodiment, a method may include iteratively simulating candidate control trajectories, via a processor, to control an environmental control system of a structure using upper confidence bound for trees (UCT), where each candidate control trajectory is simulated by selecting a control action at each of a plurality of time steps over a period of time that has the highest upper bound on possible performance using value estimates from previous simulations and predicting a temperature for a next time step of the plurality of time steps that results from applying the selected control action using a thermal model, determining a value estimate of each candidate control trajectory using a cost function and update the value estimate of each control action selected in each candidate control trajectory, selecting a control trajectory with the highest value using UCT, and applying the selected candidate control trajectory to control the environmental control system.

BRIEF DESCRIPTION OF THE DRAWINGS

These and other features, aspects, and advantages of the present disclosure will become better understood when the following detailed description is read with reference to the accompanying drawings, in which like characters represent like parts throughout the drawings, wherein.

DETAILED DESCRIPTION

Figure 1:
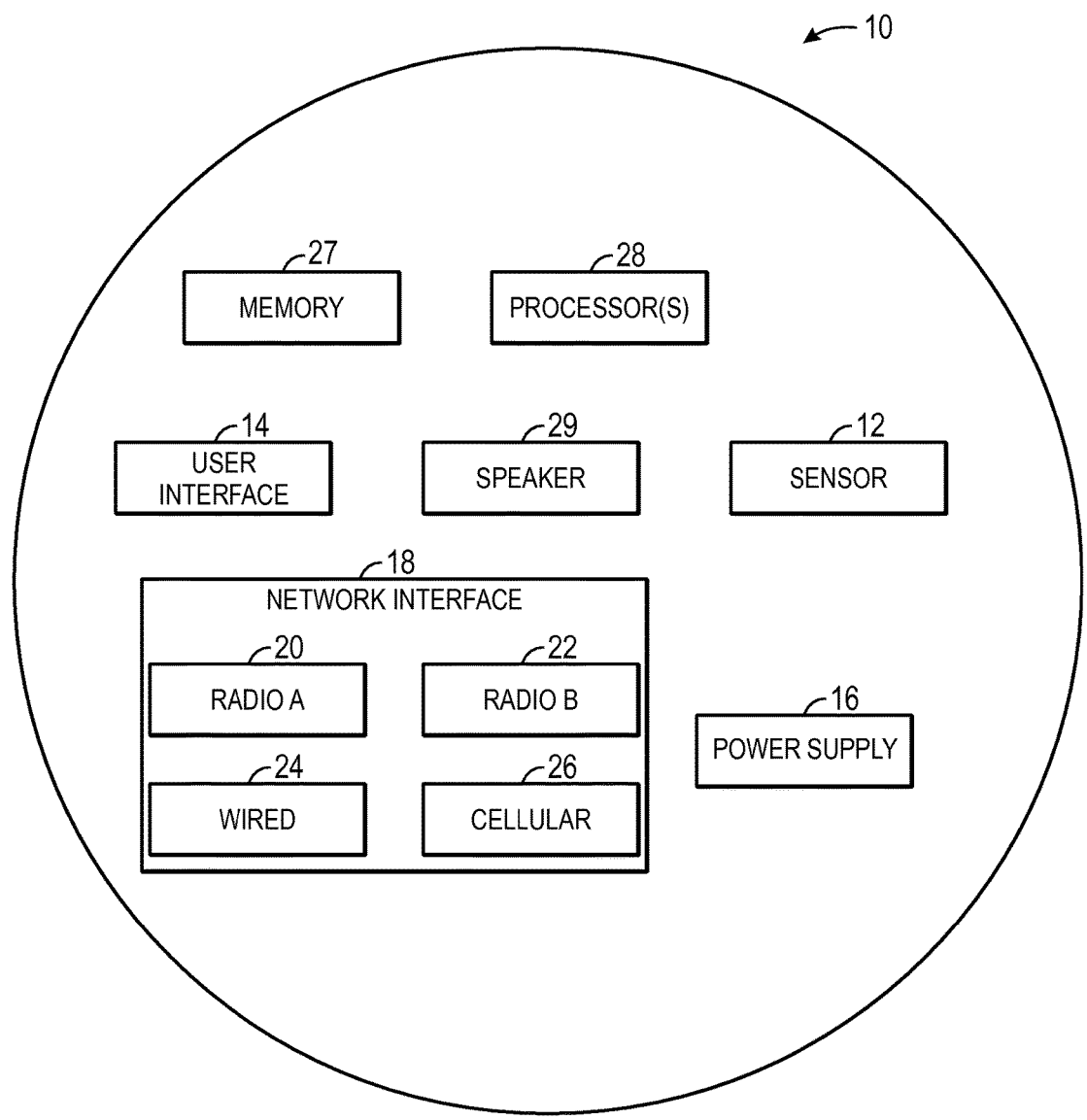
FIG. 1 illustrates a block diagram of a device that may communicate with other devices disposed in a smart-home environment, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Oftentimes, heating, ventilating, and air conditioning (HVAC) systems may be controlled using a control strategy referred to as "bang-bang control." As noted above, bang-bang control is a basic control strategy that turns the HVAC system on and off based on a maintenance band around a target temperature. For example, the maintenance band may include an upper band that is ~0.5 degrees above a target temperature and, when the temperature reaches the upper band, the HVAC system is turned on. Likewise, the maintenance band may include a lower band that is ~0.5 degrees below the target temperature and, when the temperature reaches the lower band, the HVAC system is turned off. This basic control strategy is not tailored to a particular structure, nor does it take into account various factors (e.g., upcoming setpoints, weather changes, user preferences). More specifically, there are usually no other control actions that take place within this maintenance band. Bang-bang control is akin to a one-size-fits-all approach. Thus, electronic devices that control HVAC system's can greatly improve the efficiency of the HVAC system and the temperature comfort level provided by the HVAC system by using a more adaptable control strategy that at least considers a particular structure, user preferences (e.g., energy usage, energy type, temperature comfort level), and/or outdoor weather, among other things.

Accordingly, this disclosure relates to systems, methods, apparatus, and related computer programs for controlling environmental control systems, such as HVAC systems, in a smart-home network using a predictive control with a model. It should be appreciated that, while an HVAC system is discussed by way of example in this disclosure, the disclosed systems, methods, apparatus, and related computer programs may involve any suitable environmental control system that can adjust the temperature of a structure (e.g., an environmental control system that automatically opens windows or vents to raise or lower the temperature in the structure, or a system that cools only or heats only). There are several embodiments that enable controlling the HVAC using a predictive control to improve efficiency and comfort, among other things. For example, in one embodiment, the predictive control may include predicting temperatures using a model and possible control scenarios and applying the control scenario with the desired temperature predictions.

In another embodiment, the predictive control may be an upper confidence bound for trees (UCT) control. The UCT control may be used to generate a search tree by iteratively simulating a candidate control trajectory using a thermal model and a cost function. The candidate control trajectories may refer to a set of control actions (e.g., turn or keep cooling on or off, turn or keep heating on or off, turn or keep stage 1 heat on or off) to execute at respective time steps over a period of time to produce a predicted temperature trajectory. At each time step of the candidate control trajectory, the UCT control may select the control action that has the highest upper confidence bound on possible performance using value estimates generated by the cost function from previous candidate control trajectory simulations. If there have not been previous simulations, then the UCT control may use a default control action (e.g., based on bang-bang control). There also may be various constraints imposed on the possible control actions to be taken. Then, the UCT control may predict the next time steps' temperature using the selected control action and the thermal model. The UCT control may loop through this process until control actions have been selected for all time steps over a duration of time or until the process is stopped for another reason (e.g., time runs out).

Next, the simulated candidate control trajectory is input into a cost function that may include at least factors related to efficiency, wear and tear, and temperature comfort. Depending on the user's preferences (e.g., temperature, energy usage), the cost function determines the value of the trajectory and updates the value of each control action selected previously in the trajectory. It may be understood that, in some embodiments, a higher value may be referred to as a lower cost and a candidate control trajectory that produces the lowest cost is desirable, while in some embodiments, the higher value may be referred to as a higher reward and a candidate control trajectory that produces the highest reward is desirable. Accordingly, for purpose of this discussion, choosing a control action with the highest value may also refer to choosing a control action with the lowest cost. The UCT control may then simulate another candidate control trajectory by considering the previous simulations results until a desired number of candidate control trajectories have been simulated or the process is stopped (e.g., time runs out). As the candidate control trajectories are simulated, the control actions with the highest value are saved by the UCT control as the actions to be taken. Further, the UCT control may determine that certain trajectories consistently produce a value lower than desired and may cease exploring additional control actions for those trajectories. The UCT control may then execute the control action with the highest value at each time step to control the temperature of the structure.

Benefits of controlling the HVAC system in a smart-home network according to the disclosure may include reducing energy consumption by running the HVAC system more efficiently (e.g., improved cycles for the HVAC system and structure, reduced runtime of the HVAC system, inhibited heating cycles by using weather forecasts, early on by pre-cooling for upcoming setpoints, early off by starting to drift early for upcoming efficient setpoints, improved multi-stage control by considering different stage costs and effectiveness for the structure) and improving the temperature comfort provided by the HVAC system. As previously mentioned, improving the temperature comfort may refer to keeping the difference between the actual indoor temperature and the user's preferred temperature near minimal. As such, in some embodiments, the predictive control may be configured to only choose a control strategy that may result in the same or better comfort than the current control strategy. Also, in some embodiments, the predictive control may change control actions only if comfort can be improved without changing HVAC usage. Further, the predictive control may account for outdoor weather so comfort can also improve, without HVAC usage increase, in case of sudden weather changes (e.g., postpone actuating cooling of a structure right before a cold front approaches).

Further advantages include, tailoring a control strategy for a particular house or structure. For example, the predictive control can adapt to houses that change temperatures significantly faster than other houses (e.g., leaky houses) or to houses that are exceptionally slower to change temperatures.

As will be described below, the predictive control can detect the speed of change of the structure and can adjust the length of time steps where control actions are executed accordingly. In addition, the disclosed techniques may select a control trajectory that enhances temperature control using stochastic predictions for times when the user is away from the structure. Yet another advantage may include balancing usage of multiple stages by deriving each stages' relative cost to one another (e.g., the cost may be determined by knowing that certain stages use certain percentages of energy and takes a certain amount of time to heat so the predictive control can determine when to turn on and what stage to use). As may be appreciated, and discussed in detail below, the disclosed techniques confer an abundant amount of advantages over bang-bang control and greatly enhance temperature control and/or efficiency of HVAC systems.

Smart-Home Network

With the foregoing in mind, FIG. 1 illustrates an example of a device 10 that may communicate with other like devices within a smart-home environment. In one embodiment, the device 10 may include one or more sensors 12, a user-interface component 14, a power supply 16 (e.g., including a power connection and/or battery), a network interface 18 (e.g., including a radio A 20, a radio B 22, a wired component 24, and a cellular component 26), a memory 27, a processor 28, a speaker 29, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor 12, many embodiments may include multiple sensors 12. In some instances, the device 10 may include one or more primary sensors 12 and one or more secondary sensors 12. Here, the primary sensor(s) 12 may sense data central to the core operation of the device (e.g., sensing a temperature in a thermostat or sensing smoke in a smoke detector), while the secondary sensor(s) 12 may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain embodiments, the user-interface components 14 may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of a user-interface component 14 (e.g., adjusting a set point temperature by 1 degree F. for every 10° rotation of a rotatable-ring component). Physically and virtually movable user-interface components 14 can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component 14 may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or the audio speaker 29.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices 10. In one embodiment, the network interface 18 may communicate using a standard network protocol, such as Bluetooth® Low Energy (BLE), Dust Networks®, Z-wave®, WiFi, and ZigBee®. Additionally or alternatively, the network interface 18 may communicate via an efficient network layer protocol (e.g., Thread™). For example, the efficient network layer protocol may enable the device 10 to wirelessly communicate IPv6-type data or traffic using a RIPng routing mechanism and a DTLS security scheme. To communicate wirelessly on the network, the network interface 18 may include a wireless card (e.g., SIM card) or some other transceiver connection. Further, the network interface 18 may include two radios: represented in FIG. 1 as radio A 20 and radio B 22. These radios 20 and 22 may send and/or receive heartbeat signals over a shared or overlapping spectrum usable to both of the radios 20 and 22. For example, the radio A 20 may be a WiFi radio and the radio B 22 may be a Bluetooth® Low Energy radio. Additionally or alternatively, the radios 20 or 22 may be any other suitable radio circuitry. The radios 20 and 22 may use certain overlapping spectrum such that one can detect signals from the other. When one of the radios 20 or 22 fails to receive a heartbeat signal from the other, the device 10 may leverage a cellular component 26 (e.g., 3G, 4G, or LTE circuitry) to communicate with devices outside of the local network. The network interface 18 may also include a wired component 24, in certain embodiments. The wired component 24 may enable wired communication (e.g., Ethernet communication) with other devices 10.

The memory 27 may be any suitable article of manufacture that can serve as media to store processor-executable code, data, or the like. These articles of manufacture may represent tangible, non-transitory computer-readable media (e.g., any suitable form of memory or storage) that may store the processor-executable code used by the processor 28 to perform the presently disclosed techniques. For example, the memory 27 may be used to store one or more models (e.g., thermal) for use by the UCT control, as discussed in detail below. Additionally, the memory 27 may be used to store data received from external sources, such as weather forecasts, energy information (e.g., type of energy (fossil fuel based, renewable, etc.), energy availability, cost schedule), generated and applied trajectories and the associated state of the structure, parameters used by the UCT control, such as cost weights (e.g., a weight quantity for each factor of the cost function), time step length, number of candidate control trajectories to generate, discount factor (e.g., a quantity to discount long term effects vs. short term effects), planning depth (e.g., how many time steps ahead to plan), and the like.

The processor 28 may support one or more of a variety of different device 10 functionalities. As such, the processor 28 may include one or more processors 28 configured and programmed to carry out and/or cause to be carried out one or more of the functionalities described herein. In one embodiment, the processor 28 may include general-purpose processors 28 carrying out computer code stored in memory 27 (e.g., flash memory, hard drive, random access memory), special-purpose processors or application-specific integrated circuits, combinations thereof, and/or using other types of hardware/firmware/software processing platforms. Further, the processor 28 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 28 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 28 may include image recognition technology to identify particular occupants or objects.

In certain embodiments, the processor 28 may also include a high-power processor and a low-power processor. The high-power processor may execute computationally intensive operations such as executing the predictive control (e.g., UCT control) and applying the selected candidate control trajectory, operating the user-interface component 14, and the like. The low-power processor, on the other hand, may manage less complex processes. In some embodiments, the low-power processor may detect a hazard or temperature from the sensor 12. In one embodiment, the low-power processor may wake or initialize the high-power processor for computationally intensive processes. For example, in some embodiments the low-power processor may monitor the temperature of the structure to determine if a desired temperature has been reached and, if so, wake up the high-power processor to perform the predictive control. Additionally, the low-power processor may track time and, if a desired amount of time has elapsed, the low-power processor may wake up the high-power processor to perform the predictive control. Also, if the electronic device 10 switches a state, such as actuating the HVAC system, then the low-power processor may cause the high-power processor to wake up and perform the predictive control. Thus, the low-power processor may function as a watchdog during times where the high-power processor is deactivated or sleeping.

In some instances, the processor 28 may predict desirable settings and/or implement those settings. For example, based on the presence detection, the processor 28 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 28 may initiate an audio or visual indicator of where the person, animal or object is or may initiate an alarm or security feature if an unrecognized person is detected under certain conditions (e.g., at night or when lights are off).

In some embodiments, devices 10 may interact with each other such that events detected by a first device 10 influences actions of a second device 10. For example, a first device 10 can detect that a user has pulled into a garage (e.g., by detecting motion in the garage, detecting a change in light in the garage or detecting opening of the garage door). The first device 10 can transmit this information to a second device 10 via the efficient network layer, such that the second device 10 can, e.g., adjust a home temperature setting, a light setting, a music setting, and/or a security-alarm setting. As another example, a first device 10 can detect a user approaching a front door (e.g., by detecting motion or sudden light pattern changes). The first device 10 may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 10 may include a thermostat such as a Nest® Learning Thermostat. Here, the thermostat may include sensors 12 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user-interface component 14. As such, a user may interact with or program the thermostat using the rotatable ring such that the thermostat controls the temperature of the building by controlling the HVAC system/unit, or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off wall switches (e.g., light switch) or other electronic devices 10 when it determines that the building is vacant. As such, the thermostat may use the network interface 18 to communicate with a wall switch device 10 such that it may send a signal to the wall switch device 10 when the building is determined to be vacant. In this manner, the thermostat may efficiently manage the energy use of the building.

It should be understood that the device 10 may include all of the components illustrated (e.g., sensor 12, user interface 14, power supply 16, network interface 18, memory 27, processor 28, speaker 29), a subset of those components, or additional components. For example, some devices 10 may not include a speaker 29, some devices' network interfaces 18 may not include a cellular component 26, some devices' network interfaces 18 may include only one radio or may include more than two radios, and so forth.

Figure 2:
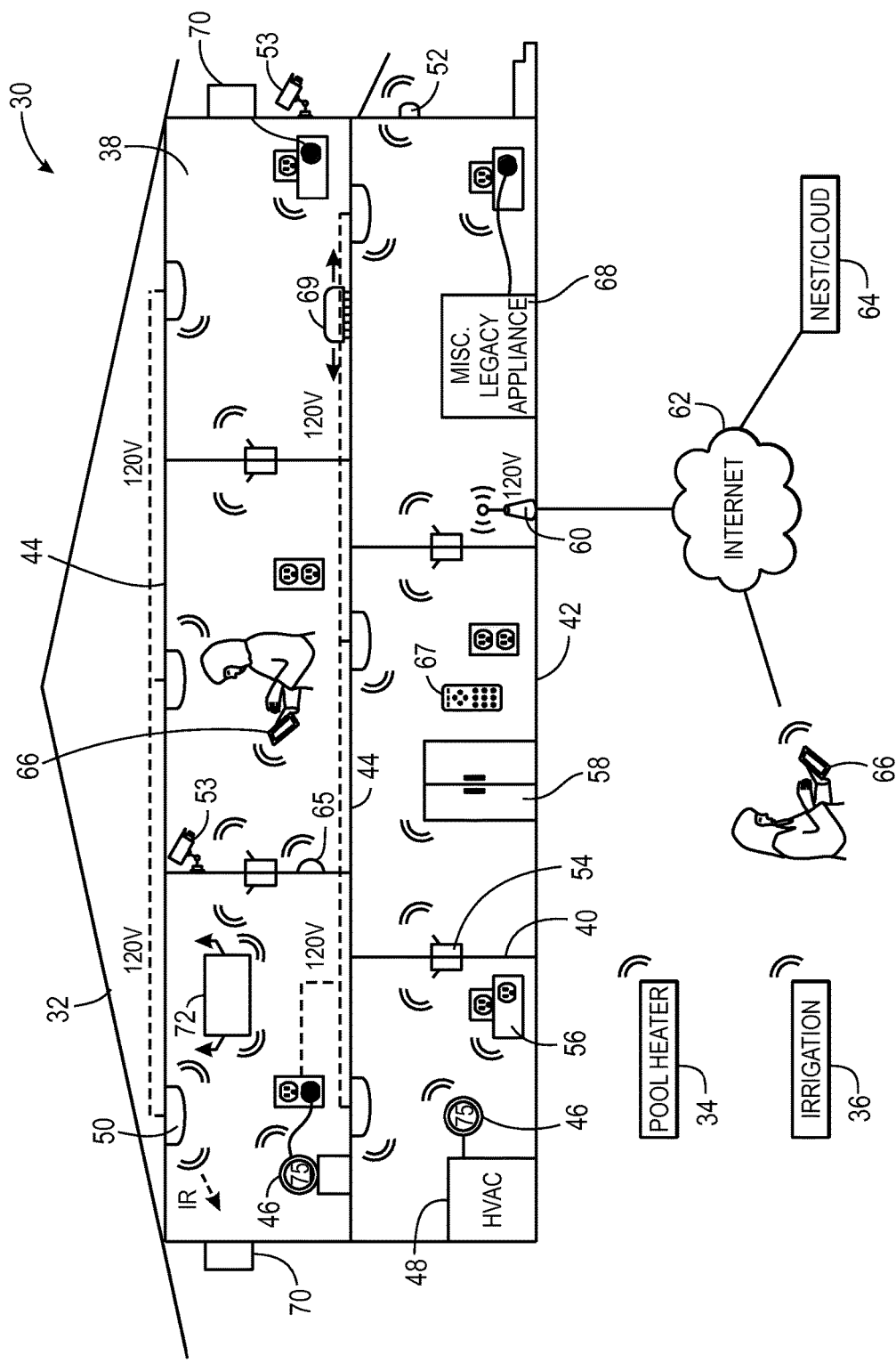
FIG. 2 illustrates a block diagram of a smart-home environment, in accordance with an embodiment.

An example of a smart-home environment 30 within which one or more of the devices 10 of FIG. 1, methods, systems, services, and/or computer program products described further herein can be applicable is illustrated in FIG. 2. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment 30 can control and/or be coupled to devices 10 outside of the actual structure 32. Indeed, several devices 10 in the smart home environment 30 need not physically be within the structure 32 at all. For example, a device 10 controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices 10 can be mounted on, integrated with and/or supported by a wall 40, floor 42, or ceiling 44.

In some embodiments, the smart-home environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), one or more intelligent, multi-sensing, network-connected entryway interface devices 52 (hereinafter referred to as "smart doorbells 52"), and one or more intelligent, multi-sensing, network-connected video cameras 53 (hereinafter referred to as "smart video cameras 53"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly. The smart hazard detector 50 may detect the presence of a hazardous substance or a substance indicative of a hazardous substance (e.g., smoke, fire, or carbon monoxide). The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come).

The smart video camera 53 may be located inside or outside of the structure 32, as depicted. In some embodiments, the smart video camera 53 may be a Nest® Dropcam®. The smart video camera 53 may be wireless (e.g., Wi-Fi) and/or wired and configured to communicate with one or more devices 10 in the smart home environment 30. Also, the smart video camera 53 may be configured to buffer video and record and send video to user devices 66 via the Internet and/or Nest® cloud service 64. Additionally, a software application may be installed on user devices 66 that is configured to access a live feed of the smart video camera 53 so that a user may view current footage. The smart video camera 53 may include a microphone and a speaker in order to enable two-way talk between the camera 53 and a user of the application. Further, the smart video camera 53 may be battery-powered or hard-wired and include infrared LEDs that enable night-vision. In addition, the smart video camera 53 may be configured to provide alerts to a subscribed or interested user of newly recorded available footage (e.g., configurable detected activities). For example, an outdoor smart video camera 53 may communicate with the smart doorbell 52 so that any time the doorbell 52 is rung and the user is not home, the camera 53 may send the video data a configurable amount of time before the doorbell 52 was rung and a configurable amount of time after the doorbell was rung 52 to the user. In this way, the user may determine who visited the home while they are away. In addition, the smart video camera 53 may begin recording footage any time movement occurs in a desired location of a field of view (e.g., if a person traverses a doorway in a room, the smart video camera 53 may begin recording for a set period of time.).

In some embodiments, the smart-home environment 30 of FIG. 2 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-home environment 30 may further include a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-home environment 30 by cooperating with the respective manufacturers of the appliances. For example, the appliances 58 can be space heaters, window AC units, motorized duct vents, etc. When plugged in, an appliance 58 can announce itself to the smart-home network, such as by indicating what type of appliance 58 it is, and it can automatically integrate with the controls of the smart-home. Such communication by the appliance 58 to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-home environment 30 are modular and can be incorporated into older and newer houses. For example, the devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices 10 described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices 10 outside of the physical home but within a proximate geographical range of the home. For example, the smart-home environment 30 may include a pool heater monitor 34 that communicates a current pool temperature to other devices 10 within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. According to embodiments, an algorithm is provided for considering the geographic location of the smart-home environment 30, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices 10 of FIG. 2 can further allow a user to interact with the device 10 even if the user is not proximate to the device 10. For example, a user can communicate with a device 10 using a computer (e.g., a desktop computer, laptop computer, or tablet) or other portable electronic device (e.g., a smartphone) 66. A webpage or app can be configured to receive communications from the user and control the device 10 based on the communications and/or to present information about the device's operation to the user. For example, the user can view a current setpoint temperature for a device 10 and adjust it using a computer or portable electronic device 66. The user can be in the structure 32 during this remote communication or outside the structure 32.

As discussed, users can control the smart thermostat 46 and other smart devices 10 in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device 66 as being associated with the home and to give permission to the occupant to use the device 66 to control the smart devices 10 in the home. An occupant can use their registered device 66 to remotely control the smart devices 10 of the home, such as when the occupant is at work or on vacation. The occupant may also use their registered device 66 to control the smart devices 10 when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment 30 "learns" who is an occupant and permits the devices 66 associated with those individuals to control the smart devices 10 of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 30. The guest-layer of controls gives guests access to basic controls (e.g., a judicially selected subset of features of the smart devices 10), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices 10. For example, the guest layer of controls will not permit the guest to adjust the heat-pump lockout temperature.

A use case example of this is when a guest is in a smart home, the guest could walk up to the thermostat 46 and turn the dial manually, but the guest may not want to walk around the house "hunting" for the thermostat 46, especially at night while the home is dark and others are sleeping. Further, the guest may not want to go through the hassle of downloading the necessary application to their device for remotely controlling the thermostat 46. In fact, the guest may not have the home owner's login credentials, etc., and therefore cannot remotely control the thermostat 46 via such an application. Accordingly, according to embodiments of the present disclosure, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device 10, such as the smart thermostat 46, the home owner is asked if they want to enable a Local Web App (LWA) on the smart device 10. Business owners will likely say no; home owners will likely say yes. When the LWA option is selected, the smart device 10 broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device 10 is purchased from the same manufacturer. Further, according to embodiments, if there is more than one smart device 10 on the LAN, the second and subsequent smart devices 10 do not offer to set up another LWA. Instead, they register themselves as target candidates with the master LWA. And in this case the LWA user would be asked which smart device 10 they want to change the temperature on before getting the simplified user interface for the particular smart device 10 they choose.

According to embodiments, a guest layer of controls may also be provided to users by means other than a device 66. For example, the smart device 10, such as the smart thermostat 46, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device 10, the smart device 10 provides the guest with the guest layer of controls, rather than full controls.

As described below, the smart thermostat 46 and other smart devices 10 "learn" by observing occupant behavior. For example, the smart thermostat 46 learns occupants' preferred temperature set-points for mornings and evenings, and it learns when the occupants are asleep or awake, as well as when the occupants are typically away or at home, for example. According to embodiments, when a guest controls the smart devices 10, such as the smart thermostat 46, the smart devices 10 do not "learn" from the guest. This prevents the guest's adjustments and controls from affecting the learned preferences of the occupants.

According to some embodiments, a smart television remote control 67 is provided. The smart remote control 67 recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control 67 only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices 10 in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices 10") is capable of data communications and information sharing with any other of the smart devices 10, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices 10 can serve as wireless or wired repeaters. For example, a first one of the smart devices 10 can communicate with a second one of the smart device 10 via a wireless router 60. The smart devices 10 can further communicate with each other via a connection to a network, such as the Internet 62. Through the Internet 62, the smart devices 10 can communicate with a central server or a cloud-computing system 64. The central server or cloud-computing system 64 can be associated with a manufacturer, support entity, or service provider associated with the device 10. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals).

According to embodiments, the smart devices 10 combine to create a mesh network of spokesman and low-power nodes in the smart-home environment 30, where some of the smart devices 10 are "spokesman" nodes and others are "low-powered" nodes. Some of the smart devices 10 in the smart-home environment 30 are battery powered, while others have a regular and reliable power source, such as by connecting to wiring (e.g., to 120V line voltage wires) behind the walls 40 of the smart-home environment 30. The smart devices 10 that have a regular and reliable power source are referred to as "spokesman" nodes. These nodes are equipped with the capability of using any wireless protocol or manner to facilitate bidirectional communication with any of a variety of other devices 10 in the smart-home environment 30 as well as with the central server or cloud-computing system 64. On the other hand, the devices 10 that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices 10 in the smart-home environment 30, such as the spokesman nodes, cannot send information to these low-power nodes.

As described, the smart devices 10 serve as low-power and spokesman nodes to create a mesh network in the smart-home environment 30. Individual low-power nodes in the smart-home environment 30 regularly send out messages regarding what they are sensing, and the other low-powered nodes in the smart-home environment 30—in addition to sending out their own messages—repeat the messages, thereby causing the messages to travel from node to node (i.e., device 10 to device 10) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able send messages across the entire smart-home environment 30 as well as over the Internet 62 to the central server or cloud-computing system 64. According to embodiments, the mesh network enables the central server or cloud-computing system 64 to regularly receive data from all of the smart devices 10 in the home, make inferences based on the data, and send commands back to one of the smart devices 10 to accomplish some of the smart-home objectives described herein.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-home environment 30. The spokesman nodes drop down to a low-power protocol to communicate the commands to the low-power nodes throughout the smart-home environment 30, as well as to other spokesman nodes that did not receive the commands directly from the central server or cloud-computing system 64.

An example of a low-power node is a smart nightlight 65. In addition to housing a light source, the smart nightlight 65 houses an occupancy sensor, such as an ultrasonic or passive IR sensor, and an ambient light sensor, such as a photoresistor or a single-pixel sensor that measures light in the room. In some embodiments, the smart nightlight 65 is configured to activate the light source when its ambient light sensor detects that the room is dark and when its occupancy sensor detects that someone is in the room. In other embodiments, the smart nightlight 65 is simply configured to activate the light source when its ambient light sensor detects that the room is dark. Further, according to embodiments, the smart nightlight 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device 10 to smart device 10) within the smart-home environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors 12, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors 12 to the other devices 10 and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 54, 56, 58, and 65) can function as "tripwires" for an alarm system in the smart-home environment 30. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart nightlight 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65.

In some embodiments, the mesh network can be used to automatically turn on and off lights as a person transitions from room to room. For example, the low-powered and spokesman nodes detect the person's movement through the smart-home environment 30 and communicate corresponding messages through the mesh network. Using the messages that indicate which rooms are occupied, the central server or cloud-computing system 64 or some other device 10 activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart nightlight 65. Alternatively, this mapping of light sources to wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system 64 or some other device 10 could automatically determine the routes using uploaded maps, diagrams, architectural drawings of the smart-home house, as well as using a map generated based on positional information obtained from the nodes of the mesh network (e.g., positional information from the devices 10 is used to construct a map of the house). In operation, when an alarm is activated (e.g., when one or more of the smart hazard detector 50 detects smoke and activates an alarm), the central server or cloud-computing system 64 or some other device 10 uses occupancy information obtained from the low-powered and spokesman nodes to determine which rooms are occupied and then turns on lights (e.g., nightlights 65, wall switches 54, wall plugs 56 that power lamps) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor 12, a processor 28, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet 62. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot(s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots 69"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots 69.

Provided according to one embodiment is a home automation and security system (e.g., as shown in FIG. 2) that is remotely monitored by a monitoring service by virtue of automated systems (e.g., cloud-based servers or other central servers 64, hereinafter "central server 64") that are in data communications with one or more network-connected elements of the home automation and security system. The away-service robots 69 are configured to be in operative data communication with the central server 64, and are configured such that they remain in a non-away-service state (e.g., a dormant state at their docking station) unless permission is granted from the central server 64 (e.g., by virtue of an "away-service-OK" message from the central server) to commence their away-service activities. An away-state determination made by the system, which can be arrived at (i) exclusively by local on-premises smart device(s) 10 based on occupancy sensor data, (ii) exclusively by the central server 64 based on received occupancy sensor data and/or based on received proximity-related information such as GPS coordinates from user smartphones or automobiles, or (iii) any combination of (i) and (ii) can then trigger the granting of away-service permission to the away-service robots 69 by the central server 64. During the course of the away-service robot 69 activity, during which the away-service robots 69 may continuously detect and send their in-home location coordinates to the central server 64, the central server 64 can readily filter signals from the occupancy sensing devices to distinguish between the away-service robot 69 activity versus any unexpected intrusion activity, thereby avoiding a false intrusion alarm condition while also ensuring that the home is secure. Alternatively or in conjunction therewith, the central server 64 may provide filtering data (such as an expected occupancy-sensing profile triggered by the away-service robots 69) to the occupancy sensing nodes or associated processing nodes of the smart home, such that the filtering is performed at the local level. Although somewhat less secure, it would also be within the scope of the present teachings for the central server 64 to temporarily disable the occupancy sensing equipment for the duration of the away-service robot 69 activity.

According to another embodiment, functionality similar to that of the central server 64 in the above example can be performed by an on-site computing device such as a dedicated server computer, a "master" home automation console or panel, or as an adjunct function of one or more of the smart-home devices 10 of FIG. 2. In such an embodiment, there would be no dependency on a remote service provider to provide the "away-service-OK" permission to the away-service robots 69 and the false-alarm-avoidance filtering service or filter information for the sensed intrusion detection signals.

According to other embodiments, there are provided methods and systems for implementing away-service robot 69 functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot 69 activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots 69 are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots 69 are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots 69 to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot 69 requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s) 69, on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot 69, and are further configured such that no disturbance-detected outcome will occur for as long as that particular detectable signal or environmental "signature" is detected. By way of example, a particular kind of vacuum-cleaning away-service robot 69 may emit a specific sound or RF signature. For one embodiment, the away-service environmental signatures for each of a plurality of known away-service robots 69 are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots 69 for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots 69 by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot 69 will remain relatively constant from event to event, and in view of the fact that the away-service events will likely either (a) themselves be triggered by some sort of nonoccupancy condition as measured by the away-service robots 69 themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots 69 are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors 12 of the smart devices 10 located in the mesh network of the smart-home environment 30 in combination with rules-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device 10 in the smart-home environment 30 that happens to be closest to the occupant when the occupant falls asleep will be the device 10 that transmits messages regarding when the occupant stopped moving, from which the central server or cloud-computing system 64 will make inferences about where and when the occupant prefers to sleep. Also, the closest smart device 10 to the sleeping occupant may be the device 10 that sounds the alarm to wake the occupant. In this manner, the "smart alarm clock" will follow the occupant throughout the house, by tracking the individual occupants based on their "unique signature", which is determined based on data obtained from sensors 12 located in the smart devices 10. For example, the sensors 12 include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat 46 to before going to sleep and which temperature the occupant sets the thermostat 46 to upon waking up. In some embodiments, the wake times may be based upon the strategy selected by the predictive control (e.g., the candidate control trajectory selected by the UCT control). That is, the wake times may depend upon the duration of selected time steps in the candidate control trajectory or when temperatures predicted by the candidate control trajectory according to selected control actions are reached in the house. Further, the wake times may take into account when actuation states take place in the HVAC system (e.g., upcoming setpoints).

According to an embodiment, a device 10 is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices 10 in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors 12 of the smart devices 10 located throughout the smart-home environment 30 in combination with rules-based inference engines or artificial intelligence provided at the central server or cloud-computing system 64 are used to detect or monitor the progress of Alzheimer's Disease. For example, the unique signatures of the occupants are used to track the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 64 analyze the person's migration data collected by the mesh network of the smart-home environment 30 to identify such patterns.

In addition, another device 10 in the smart-home environment 30 may include a hub device 72, such as a Nest® hub device. In some embodiments, the hub device 72 may be an example of the "master" panel previously mentioned regarding the security system. The hub device 72 may communicate wirelessly over the wireless network provided by the router 60 with each of the other devices 10 in the smart-home environment 30 via separate channels. For example, the hub device 72 may monitor each device 10 to ensure it is active and communicating by pinging each device 10 over its individual channel. Further, the hub device 72 may communicate with remote servers such as Nest® servers 64, over the Internet via WiFi or its wired component 24 and/or over 3G via its cellular component 26. Additionally, the hub device 72 may communicate with cellular towers via its cellular component 26 as an alternative communication medium in case its wireless network is being subjected to a jamming attack. Thus, the hub device 72 provides robust mechanisms to detect wireless communication jamming attacks and notify the proper parties of the incident. As may be appreciated, employing such techniques greatly enhances the security a homeowner may experience and may deter crime.

Figure 3:
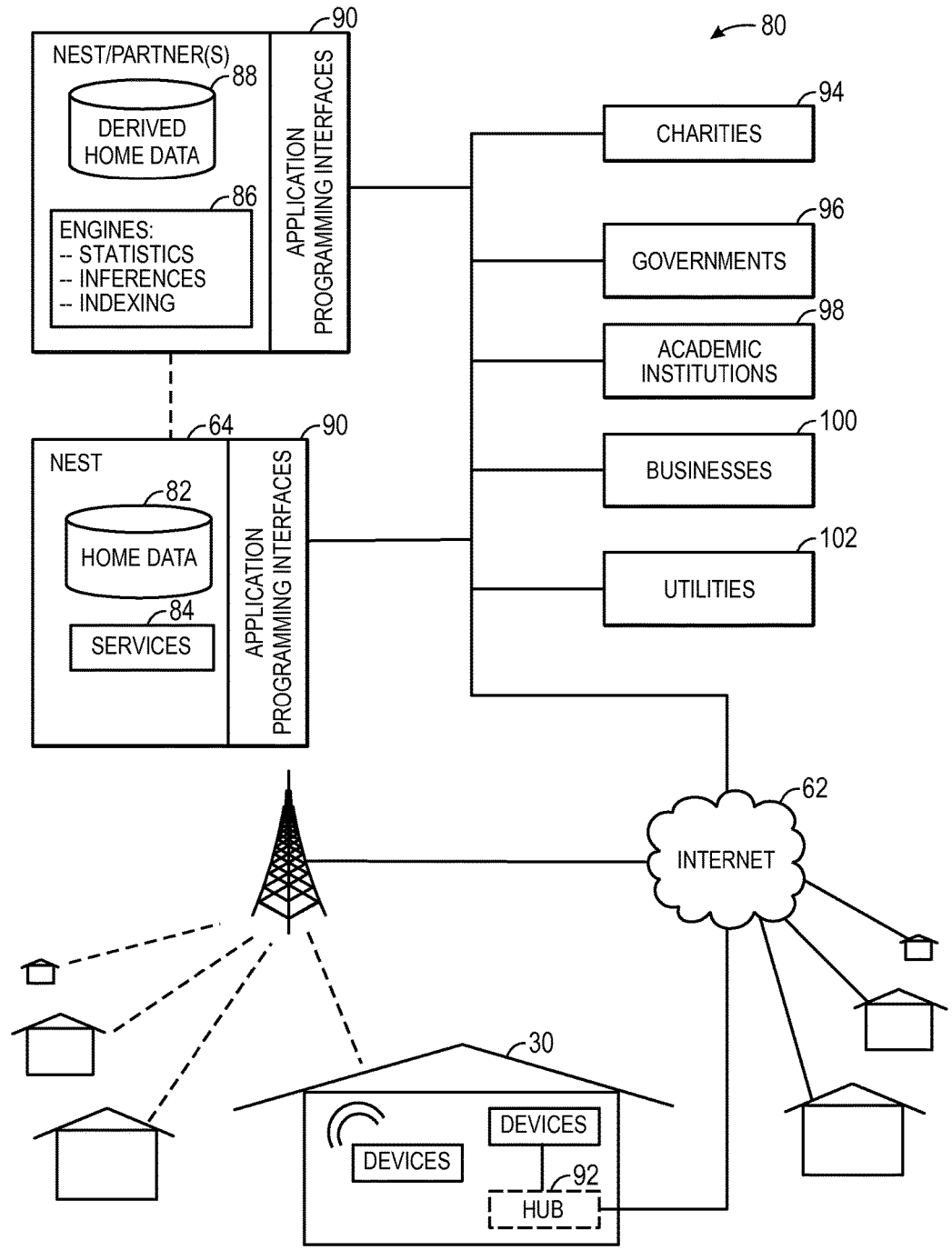
FIG. 3 illustrates a network-level view of an extensible devices and services platform with which the smart-home environment of FIG. 2 can be integrated, in accordance with an embodiment.

As illustrated in FIG. 3, an embodiment of the extensible devices and services platform 80 includes a processing engine 86, which can be concentrated at a single server or distributed among several different computing entities without limitation. The processing engine 86 can include engines configured to receive data from devices of smart-home environments 30 (e.g., via the Internet 62 or a hubbed network), to index the data, to analyze the data and/or to generate statistics based on the analysis or as part of the analysis. The analyzed data can be stored as derived home data 88.

Results of the analysis or statistics can thereafter be transmitted back to the device 10 that provided home data used to derive the results, to other devices 10, to a server providing a webpage to a user of the device 10, or to other non-device entities. For example, use statistics, use statistics relative to use of other devices 10, use patterns, and/or statistics summarizing sensor 12 readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device 10 usage across a population of devices 10 and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices 10 located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices 10 are used to detect sound, vibration, and/or motion created by running water. Based on the detected sound, vibration, and/or motion, the central server or cloud-computing architecture 64 makes inferences about water usage in the home and provides related services. For example, the central server or cloud-computing architecture 64 can run programs/algorithms that recognize what water sounds like and when it is running in the home. According to one embodiment, to map the various water sources of the home, upon detecting running water, the central server or cloud-computing architecture 64 sends a message to an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing architecture 64 will know that the water usage at that time is associated with that toilet. Thus, the central server or cloud-computing architecture 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices 10 are used to detect sound, vibration, and/or motion created by mice and other rodents as well as by termites, cockroaches, and other insects (collectively referred to as "pests"). Based on the detected sound, vibration, and/or motion, the central server or cloud-computing architecture 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing architecture 64 can determine the "signatures" of particular types of pests.

For example, in the event the central server or cloud-computing architecture 64 detects sounds that may be associated with pests, it notifies the occupants of such sounds and suggests hiring a pest control company. If it is confirmed that pests are indeed present, the occupants input to the central server or cloud-computing architecture 64 confirms that its detection was correct, along with details regarding the identified pests, such as name, type, description, location, quantity, etc. This enables the central server or cloud-computing architecture 64 to "tune" itself for better detection and create "signatures" or "fingerprints" for specific types of pests. For example, the central server or cloud-computing architecture 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third-party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps, that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
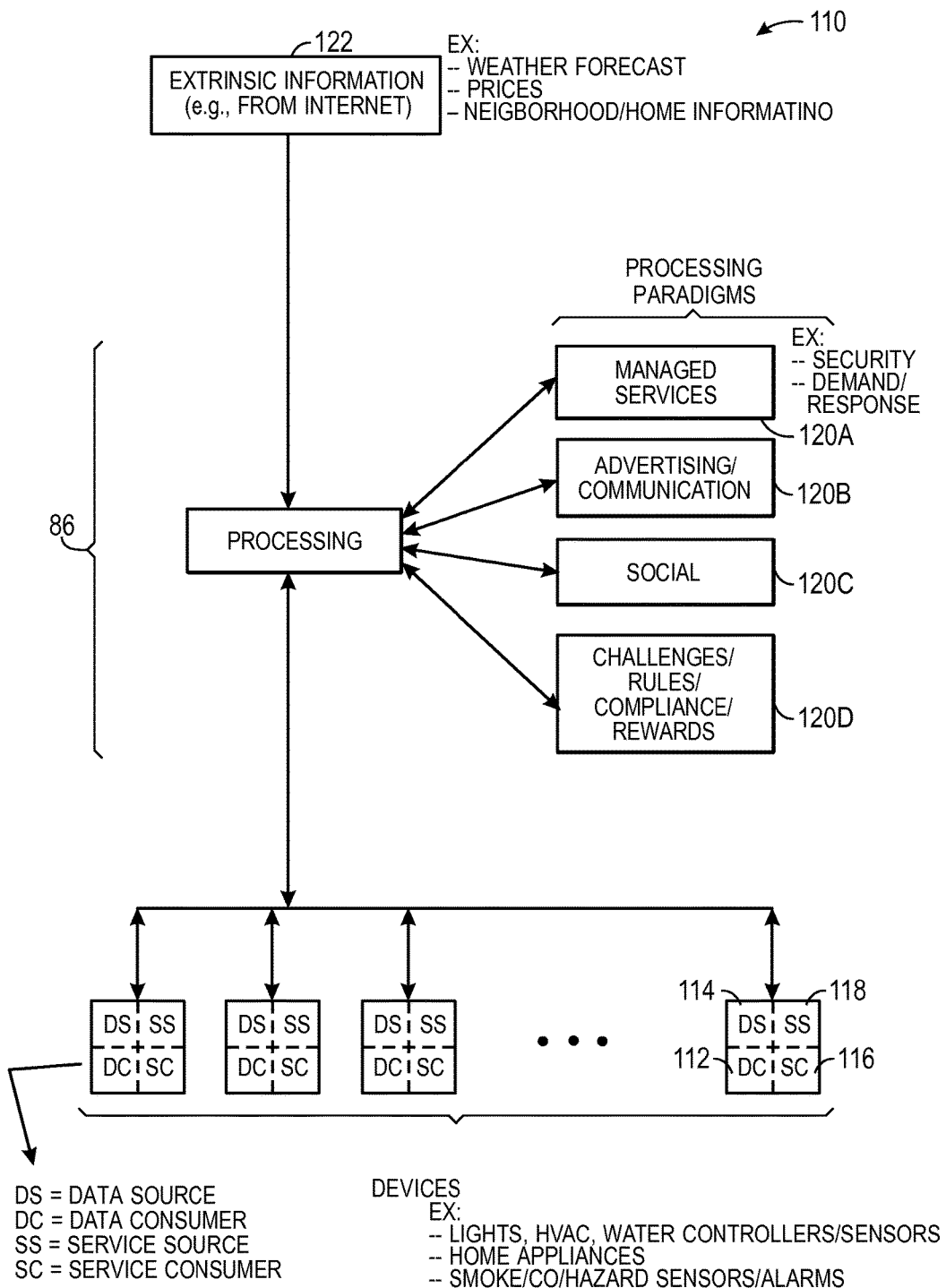
FIG. 4 illustrates an abstracted functional view of the extensible devices and services platform of FIG. 3, with reference to a processing engine as well as devices of the smart-home environment, in accordance with an embodiment.

To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices 10 situated in smart-home environments 30 will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices 10 to achieve their local and immediate objectives, the extensible devices and services platform 80 can also be configured to harness the large amount of data that is flowing out of these devices. In addition to enhancing or optimizing the actual operation of the devices 10 themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120a that monitors and manages primary or secondary device 10 functions. The device 10 functions can include ensuring proper operation of a device 10 given user inputs, estimating that (e.g., and responding to an instance in which) an intruder is or is attempting to be in a dwelling, detecting a failure of equipment coupled to the device 10 (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device 10 interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings generated by the predictive control disclosed herein that result in low power bills and other users may download the HVAC settings to their smart thermostat 46 to reduce their power bills.

The processing engine 86 can include a challenges/rules/compliance/rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat 46 by one degree for one week. Those that successfully complete the challenge are rewarded, such as by coupons, virtual currency, status, etc. Regarding compliance, an example involves a rental-property owner making a rule that no renters are permitted to access certain owner's rooms. The devices 10 in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device 10, to determine a characteristic of the environment near the device 10 (e.g., outside a structure that the device is enclosed in), to determine services or products available to the user, to identify a social network or social-network information, to determine contact information of entities (e.g., public-service entities such as an emergency-response team, the police or a hospital) near the device 10, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Predictive Control of an HVAC System

As previously discussed, the predictive control techniques described below enable improving efficiency and comfort provided by an environmental control system (e.g., an HVAC system), among other things. The disclosed techniques may account for numerous factors, such as upcoming setpoint changes, weather forecast predictions, the heating and cooling speed of the HVAC system being controlled, temperature error, energy efficiency, wear-and-tear on the HVAC system, among many others. With the various factors accounted for and based on the user's settings, such as whether the user prefers the HVAC system to be more energy efficient and/or to provide enhanced comfort, the predictive control can tailor a control strategy accordingly.

In one embodiment, the predictive control may include predicting temperatures using a model and possible control scenarios and applying the control scenario with the desired temperature predictions. In another embodiment, the predictive control may generate a control strategy by simulating one or more candidate control trajectories to determine how control actions at time steps over a period of time may affect the ambient temperature. The predictive control may use a thermal model of a structure to predict ambient temperatures that may result from the control actions. Control actions may refer to certain actuation states such as turning or keeping the cooling on or off, turning or keeping the heating on or off, and turning or keeping a stage of heating (e.g., stage 1, stage 2) on or off for multi-stage HVAC systems. In some embodiments, the model of the structure may be a thermal model that is dynamically created by the device 10, provided by an external system, or pre-loaded on the device 10. Once the one or more candidate control trajectories are simulated, they may be valued by a cost function, and the candidate control trajectory with the highest value may be selected as the control strategy to apply to the HVAC system. It may be beneficial to describe and compare another paradigm of controlling an HVAC system, such as bang-bang control, to illustrate the vast benefits of the present disclosure.

Figure 5:
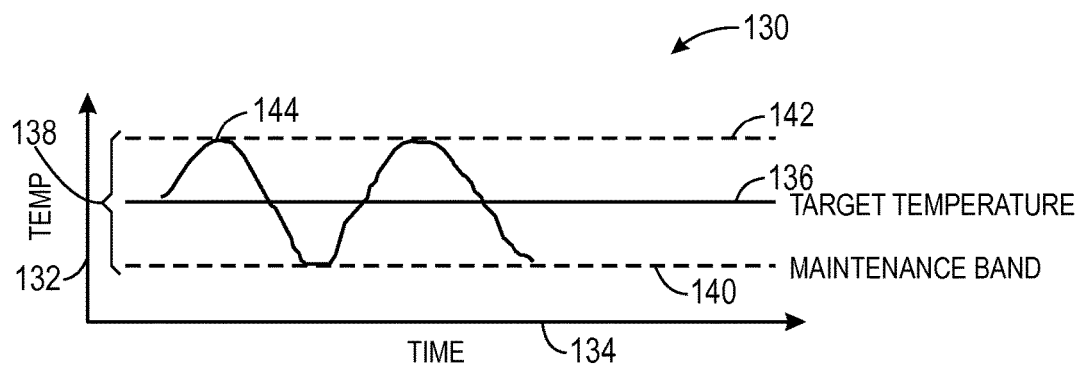
FIG. 5 illustrates a graph depicting temperature over time including a temperature trajectory resulting from using bang-bang control.

Accordingly, FIG. 5 illustrates a graph 130 of temperature 132 over time 134 that results from using bang-bang control to manage cooling a structure. The user may have set the thermostat to a target temperature setpoint 136. Typically, bang-bang control employs a maintenance band 138 around the setpoint 136. The maintenance band 138 includes a lower maintenance band 140 that is a certain number of degrees (e.g., ~0.5) below the target setpoint 136 and an upper maintenance band 142 that is a certain number of degrees (e.g., ~0.5) above the target setpoint 136. The bang-bang control monitors the temperature as it changes over time and when the temperature reaches the upper maintenance band 142, the control actuates the HVAC system to lower the temperature closer to the target setpoint 136. In some scenarios, the bang-bang control may overshoot the target setpoint 136 because after the HVAC system is deactivated, the temperature will drift back up to the setpoint 136 and eventually pass the setpoint 136 again. When the temperature is cooled to the point where it hits the lower maintenance band 140, the HVAC system is deactivated.

Controlling the temperature in this fashion may generate a temperature trajectory 142 that fluctuates around the target temperature setpoint 136 like a waveform, as shown. As may be appreciated, the maintenance band 138 provides room for error between the actual temperature and the setpoint 136 because the only considerations made by the control strategy are whether the temperature reaches the lower or upper maintenance bands (140, 142). That is, there are no other factors or decisions made while the temperature is cooling or drifting within the maintenance band 138. As such, bang-bang control is a rudimentary control system that makes the binary decision to turn the HVAC system on or off when certain temperature thresholds are reached. Bang-bang control is not concerned with enhancing the comfort provided by the HVAC system beyond merely maintaining the temperature somewhere between the maintenance bands 140, 142. Nor is bang-bang control concerned with running the HVAC system more efficiently than turning on and off at the edges of the maintenance bands 140, 142, and thus bang-bang control may not consider wear-and-tear on the HVAC system, outdoor weather, or upcoming setpoint changes, among other things.

Figure 6:
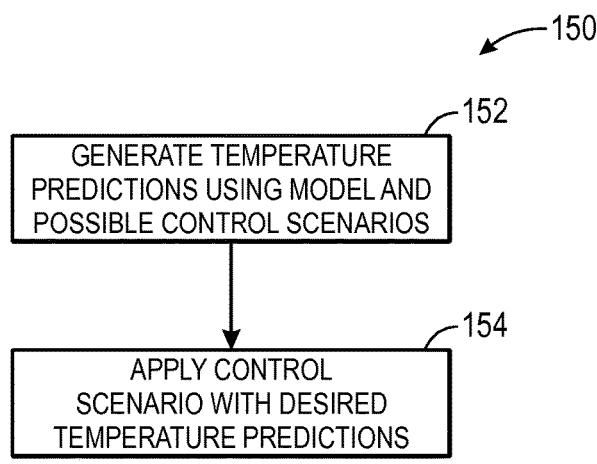
FIG. 6 illustrates a flowchart of a method for controlling a heating, ventilating, and air conditioning (HVAC) system by generating temperature predictions using a model and possible control scenarios, in accordance with an embodiment.

In contrast to bang-bang control, FIG. 6 illustrates a flowchart of a method 150 for controlling an environmental control system (e.g., HVAC system) using predictive control in accordance with an embodiment of this disclosure. The method 150 may include generating temperature predictions using a model and possible control scenarios (process block 152) and applying the control scenario with the desired temperature predictions (process block 154). The process may be implemented as computer instructions stored on one or more tangible, non-transitory computer-readable media (e.g., memories 27) and executable by one or more processors 28. Regarding process block 152, the temperature predictions may be performed by any suitable decision making techniques using a predictive model. Example decision making techniques may include those available in the Monte Carlo Tree Search (MCTS) family (e.g., UCT), stochastic predictions, artificial intelligence, neural networks, data mining, and so forth.

More specifically, MCTS may refer to a method for finding near optimal decisions in decision processes (e.g., optimization problems), such as the HVAC system control actions to execute at different time steps, by iteratively building a search tree that results from taking random samples in the decision space. The search tree may be incrementally built and in an asymmetric fashion. During each iteration, MCTS simulates a candidate control trajectory to build the search tree. When generating each candidate control trajectory, MCTS may balance some exploration, by exploring areas of the search tree that are not well sampled, with exploitation, by focusing on areas that appear to be promising. The candidate control trajectories are generated by randomly selecting each node (e.g., control action) until a desired ending point is reached. In some scenarios, the ending point may be an elapsed amount of time, a target temperature, and so forth. The result of each candidate control trajectory is then used to value the control actions in the search tree so that more optimal nodes may be selected in future candidate control trajectories. For example, in some embodiments, if a certain control action at a node resulted in an undesired predicted temperature using the model, then that control action may receive a low value, whereas a control action at a node that resulted in a desired predicted temperature using the model may receive a high value.

The values that are assigned may be based on the user's preferences. For example, if the user prefers the system to be more energy efficient, the control strategy that uses energy more efficiently, by, for example, reducing HVAC runtime, may receive a higher value, even if the comfort provided by the predicted temperature is worse. Likewise, a control action at a node that uses energy less efficiently by increasing HVAC runtime may receive a lower value. In addition, if a user prefers comfort over energy efficiency, control actions that result in predicted temperatures closer to the setpoint temperature may receive higher values and control actions that result in predicted temperatures further away from the setpoint may receive lower values.

In one specific embodiment, which is described in more detail below, UCT, which is a member of the MCTS family, may be specifically tailored to control an HVAC system. UCT control may follow the general methodology of MCTS by generating a search tree by simulating out one or more candidate control trajectories. However, UCT control may use a tree policy referred to as upper confidence bound (UCB) to govern the selection of nodes (e.g., control actions) in each candidate control trajectory. That is, the control action that provides the highest upper confidence bound on possible performance may be selected at each time step. The highest upper confidence bound may refer to the value that is assigned to each control action of a candidate control trajectory after an iteration is complete. Thus, in some embodiments, an evaluation function (e.g., cost function described below) may be used to value the candidate control trajectories and each control action during each time step. The cost function may be characterized as a mathematical equation including at least three weighted input variables related to comfort, efficiency, and wear-and-tear that outputs a value. In some embodiments, the weights may be tuned based on user preferences, among other things. Thus, the value may be indicative of a desirable or undesirable level of comfort, efficiency, and/or wear-and-tear based on how the weights are configured. For example, if a high value is output and the weight for comfort outweighs the weights for the other variables, the candidate control trajectory evaluated may be desirable to provide a close fit to setpoint temperatures.

However, in other embodiments, no evaluation function may be used and the values may be assigned to the control actions if the predicted temperature is within a threshold amount of degrees from a target setpoint. In some embodiments, control actions that emerge with the highest value (e.g., highest upper confidence bound) are selected as providing the most optimal temperature control. Further, while simulating candidate control trajectories, UCT control may stop exploring a path if the value of a control action is lower than a threshold amount. The value of a control action may be too low if it results in the HVAC runtime being excessive or the resulting predicted temperature is too far off of the target setpoint, among other things. As will be described in detail below, UCT control may enable enhanced efficiency and/or comfort provided by an HVAC system at the same time.

UCT control may be "anytime," meaning the method may be stopped at anytime and produce the most optimal results at that point in time. UCT control backpropagates the outcome of each candidate control trajectory immediately so the values of the control actions at each node are updated as soon as an iteration is complete. Thus, in some embodiments, UCT control may only generate one candidate control trajectory and the control actions selected based on the predicted temperatures using the model may be applied to control the HVAC system. However, as more candidate control trajectories are generated, the control actions that are more optimal emerge with higher values and, thus, in some embodiments, UCT control may generate any number of candidate control trajectories to enhance the comfort and/or efficiency provided by the control strategy to apply to the HVAC system.

In addition, stochastic predictions may be used to make predictions under specific conditions. Given various initial conditions about a space or partial knowledge of initial conditions about a space, such as information provided by a model (e.g., initial temperature, prior control actions, speed of cooling or heating of the HVAC system, size of structure), stochastic predictions may predict future event conditions of the space if various control actions occur. That is, stochastic predictions may predict future temperatures that result from various control actions in the space at certain times by using the model. Stochastic predictions may operate by running a number of simulations of a model that includes the initial conditions (e.g., temperatures at various times in the past) with randomly chosen parameters. The simulations that substantially match the initial conditions may be selected to forecast what the temperatures may be in the future if certain control actions are executed by the HVAC system at various times. In some embodiments, stochastic predictions may be used to enhance temperature control for the range of times the user is away from the structure or the range of errors expected in the model.

The predictive model may refer to a model that is dynamically derived via the processor 28 executing the computer instructions, pre-loaded in the memory 27, or supplied via an external system or device communicating with the network interface 18. In some embodiments, there may be more than one model pre-loaded in the memory 27 and each model may be tailored for a specific kind of structure, geographic area, or the like. The processor 28 may select the pre-loaded model that substantially matches the structure, geographic area, or the like. Also, the techniques may use more than one model to make the temperature predictions. For example, one predictive model may be configured with certain parameters (e.g., speed of the HVAC system, weather forecast) to predict the temperature resulting from a control action and the prediction may be compared to the results of another model configured with different parameters to account for any uncertainties in the models. The predictive model, described in detail below, may be a thermal model of a structure that predicts an indoor ambient temperature of the structure in response to application of an HVAC actuation state by using numerous factors.

Using the predicted temperature that results from possible control scenarios, the processor 28 may use one or more of the decision making techniques to select and apply the control scenario with the desired temperature predictions (process block 154). For example, the control scenario may include the control action to execute at each time step over a given period of time to control the temperature of the structure. This type of predictive control may provide for enhanced comfort over bang-bang control by keeping the actual temperature closer to the setpoint temperature.

As mentioned above, FIG. 7 illustrates a flowchart of an embodiment of a method 160 for controlling an HVAC system using upper confidence bound for trees (UCT) control. The method 160 may be implemented as computer instructions stored on one or more tangible, non-transitory computer-readable medias (e.g., memory 27) and executable by one or more processors 28. The step of generating temperature predictions using a model and possible control scenarios (process block 152) from FIG. 6 is replicated in FIG. 7 but with additional details related to the UCT control embodiment. Specifically, process block 152 may include simulating candidate control trajectories including a control action at each time step using UCT control (process block 162). The time steps, which are discussed in detail below, refer to a configurable interval of time when to potentially execute a control action over a configurable period of time. For example, in some embodiments, depending on the speed of the HVAC system, each time step may be between 2-3% of the total projected control period (e.g., 4 minutes in length for a 3 hour period of time). More or fewer time steps for the projected control period, however, may be selected to achieve higher or lower granularity. Indeed, in some embodiments, the number of time steps per control period may vary depending on the number of temperature setpoints, a variability of the thermal model of the structure, a higher degree of interest in personal comfort in the structure, and so forth. Thus, the UCT control may determine the control actions to execute at time steps every so many minutes per hour (e.g., every 4 minutes for 3 hours), although, as mentioned above, the time interval between time steps may vary in some embodiments. Indeed, it should be appreciated that the time steps may be configured to be any length of time for any period of time.

Process block 162 may further include selecting a control action at a certain time step that has the highest upper confidence bound on possible performance using the value estimates from previous simulations. If there are no previous simulations, then a default action may be used (e.g., based on bang-bang control) (process block 164). Thus, when the UCT control is first initiated and there are no prior simulations, the default action (e.g., bang-bang control) may be chosen for that time step. Bang-bang control as used by the UCT control may consider the predicted temperature of the structure and the target setpoint and determine whether to actuate the HVAC if the predicted temperature meets or exceeds a maintenance band around the setpoint. However, if there have been previous simulations, the UCT control may select the control action that has the highest upper confidence bound on performance using the value estimates. In some embodiments, the value estimates may be derived from using a cost function, which is described in detail below, and, generally, a control action that results in a higher value may generate a higher upper confidence bound on performance.

It should be noted that in some embodiments, the UCT control may select the control action at each time step according to the highest upper confidence bound on possible performance by using factors other than cost. For example, if the user prefers to use renewable energy (e.g., green energy), the control actions that actuate the HVAC system only when there is sufficient renewable energy available may be highly valued. Further, the value of the control action may be based on when the user prefers to use energy. For example, if the user prefers to only use energy during non-peak hours, then the UCT control may value the control actions that only actuate the HVAC system during non-peak hours higher than the control actions that actuate the HVAC system during peak hours. It may be appreciated, that there are numerous options to set the highest upper confidence bound on performance and some of those options may be directly related to user preference.

Next, process block 162 may include simulating the next time step's temperature using the selected control action and a thermal model (process block 166). Then, the method 160 determines whether there is another time step (decision block 168). If there is another time step, the method returns to process block 164 to select the control action at that time step that has the highest upper confidence bound on possible performance using the value estimate from previous simulations. If there are no previous simulations, then a default action may be used (e.g., based on bang-bang control). The method 160 cycles accordingly until a control action has been selected for all of the time steps. Once there are no more time steps, then the method 160 may determine the value of the candidate control trajectory using a cost function and update the value of each control action selected in the candidate control trajectory (process block 170). It should be noted, that the temperature predictions generated by the thermal model at each time step using the selected control actions may be used to formulate a resulting predicted temperature trajectory for the desired time period.

The values determined using the cost function may represent estimates of the true value of each control action at a given state (e.g. thermal) based on all the simulations that attempted that control action from that state. In addition, as should be understood, an upper confidence bound may be used. Initially, the upper confidence bound may be based on determined limits of the value range, and as the action is taken more and more often, the bound gets tighter and tighter around the estimate of the true value of the action. In some embodiments, the value range may be set independent of the true range of possible values to obtain a different trade-off of exploration versus exploitation. For example, if the value range is set to relatively minimal values, then the upper confidence bound may be tightly fit to the value estimate and little exploration may be performed, which may result in converging quickly to the control action with the highest value estimate. If instead, the value range is set to be exceedingly large, then large upper confidence bounds may be obtained and, as a result, lots of exploratory actions may be simulated.

In some embodiments, when the estimate of the true value of each control action is poor because few simulations have been performed, the action with the highest upper confidence bound may be selected, since it may turn out that the true value of that action is as high as the upper confidence bound. In some embodiments, the action with the highest estimated value may be selected, even if other actions have higher upper confidence bounds, because the highest estimated valued action may be expected to be more optimal, even if the other actions with the higher upper confidence bounds have the possibility of being more optimal. Based on the cost function that is used to evaluate the candidate control trajectories, there may be some absolute limits included in estimating the values of each control action. For example, the values may generally be positive because the runtime, temperature error, and number of cycles are positive. Further, there may be a rational limit to how much temperature error or how many cycles may be used, so a bound on the lower value may be determined as well.

According to an aspect of the disclosure, the control action that produces the highest value after any number of simulations may provide the highest upper confidence bound on performance, and the control action that produces the lowest value after any number of simulations may provide the lowest confidence bound on performance. In some embodiments, the upper confidence bound is fit tighter and tighter around the estimate of the true value of the action as more simulations are performed. If a control action generates the lowest value in the range of values, the UCT control may not select that control action and may not explore any child nodes of that control action. Further, some control actions at various time steps may not generate a significant difference in values. Thus, there may not be a significant advantage in performing one control action over the other at certain time steps. Indeed, both candidate control trajectories may remain viable since the candidate control trajectories have potential to produce the highest upper confidence bound on performance, so the UCT control may continue to explore control actions (e.g., child nodes) for both candidate control trajectories. As such, the UCT control may select to turn the AC on in the first time step and explore keeping the AC on in the second time step, which may produce a value indicative of the highest upper confidence bound on performance. Alternatively, the UCT control may select to turn the AC on in the first time step and explore turning the AC off in the second time step, which may generate a value in the middle of the range of values. Accordingly, the UCT control may select the candidate control trajectory that turns the AC on in the first time step and keeps the AC on in the second time step to obtain the highest upper confidence bound on performance. It should be appreciated that using the range of values may enable narrowing the fit of the upper confidence bound for candidate control trajectories tightly to a desired control strategy, whether the goal of the control strategy be enhancing efficiency of the HVAC system, improving comfort provided by the HVAC system, reducing wear-and-tear on the HVAC system, or some combination thereof.

Returning to the figure, the UCT control then determines whether to simulate another candidate control trajectory (decision block 172). Making the determination regarding the number of candidate control trajectories to simulate may consider various factors, such as configuration settings, amount of battery left, among others, which will be described in detail below. If the UCT control determines to simulate another candidate control trajectory, the method 160 returns to process block 164 to repeat the process of selecting control actions for each time step, predicting the resulting temperature using the thermal model (process block 166), evaluating the candidate control trajectory using a cost function (process block 170), and updating the control actions' values (process block 170). Once the determination is made to stop simulating candidate control trajectories, the control action with the highest value at each time step may be saved as the action to be taken (process block 174) for each respective time step. The set of control actions saved with the highest value makes up the control trajectory to execute. Finally, in process block 176, the processor 28 may execute the highest valued control action at each time step to control temperature accordingly (process block 176).

As may be appreciated, for the initial candidate control trajectory, there may not be previous simulations, so the resulting initial candidate control trajectory may include a control action based on bang-bang control at each time step. This candidate control trajectory may be evaluated using a cost function and each control action's value may be updated. If the value for the control actions did not meet the highest upper confidence bound on possible performance, then the UCT control may explore by choosing another control action at each time step to generate a different candidate control trajectory in the subsequent iterations. However, if the value for a control action did meet the highest upper confidence bound on possible performance at any time step, then the UCT control may exploit that control action by evaluating its child nodes further. As a result, in some scenarios, depending on the factors considered by the cost function, the control actions taken at each time step of the selected candidate control trajectory may vary widely from the control actions executed using bang-bang control. Alternatively, in some embodiments, the control actions selected by the UCT control may not substantially differ from those selected using bang-bang control.

It should be noted that the UCT control may take upcoming setpoint changes into account when assigning values to control actions. For example, if the UCT control selects a control action that results in a predicted temperature at the next time step that significantly deviates from the upcoming setpoint temperature at that time step, then the UCT control can assign a low value to that control action. In this way, the UCT control may factor in upcoming setpoints when simulating out candidate control trajectories and can conform the selected candidate control trajectory more closely to target setpoints. This functionality may enable early on features such as pre-cooling, pre-heating, or pre-drifting. Further, by considering the upcoming setpoints prior to the actual setpoint changes, as opposed to after the setpoint changes occur, the UCT control may reach the upcoming setpoint temperature quicker by heating, cooling, or drifting in advance.

Figure 8:
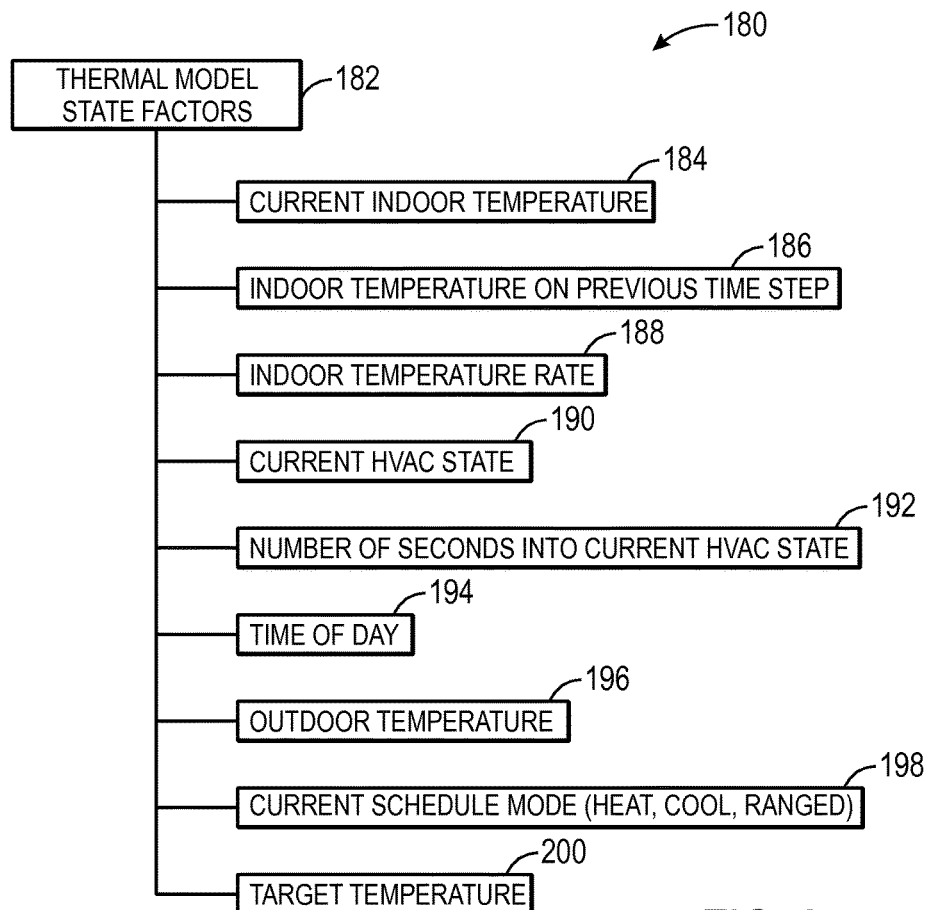
FIG. 8 illustrates a schematic diagram including various state factors used by a thermal model to predict temperatures of a structure, in accordance with an embodiment.

With regards to the model used by the predictive control described above, FIG. 8 illustrates a schematic diagram 180 including various thermal model state factors 182 used to predict temperatures of a structure, in accordance with an embodiment. Regardless of the specific application in which predictions of thermal behavior are implemented, such predictions in many embodiments are facilitated by the use of a thermal model of the structure. The thermal model itself may be defined by one or more basis functions that characterize a trajectory of an environmental condition associated with the structure, such as indoor temperature, in response to application of a stimulus, such as a change in HVAC actuation state. In generating the model, weighting factors for each of the basis functions may be fit to a history of data indicative of past environmental condition trajectories that resulted from past changes in HVAC actuation states. Once the thermal model has been generated, it may subsequently be used to simulate the thermal behavior of the structure. That is, the thermal model may characterize the house and output an ambient temperature based on a simulated control action. In embodiments where the thermal model is not dynamically generated by the processor 28, the thermal model may be preloaded on the device 10 or obtained from an external source.

It should be appreciated that the term "thermal" may include all state factors that can be used to characterize a physical system, some examples of which are discussed below. The term "model" refers generally to a description or representation of a system. The description or representation can use mathematical language, such as in the case of mathematical models. Examples of types of models and/or characteristics of models, without limitation, include: lookup tables, linear, non-linear, deterministic, probabilistic, static, dynamic, and models having lumped parameters and/or distributed parameters. The thermal model represents a state of the structure that is being modeled. The thermal model may be unique to that particular structure because each structure heats or cools differently based on efficiency of the HVAC system, the wear-and-tear of the HVAC system, whether doors or windows are open, the outdoor temperature, among other factors listed below. Thus, because of the changing factors, the thermal model may be retrained periodically based on past data.

A first factor 184 of the thermal model state factors 182 may include the current indoor temperature at the particular time step. The current indoor temperature at the particular time step may be considered when predicting the future temperature based on a selected control action. The current indoor temperature may be obtained via one or more sensors 12 of the electronic device 10.

A second factor 186 of the thermal model state factors 182 may include the indoor temperature on the previous time step. The temperature from the previous time step may enable tracking the accuracy of prediction made at the last time step of the temperature at this time step if a selected control action was executed. Also, this may enable deriving the speed of the HVAC system. For example, comparing the temperature at the previous temperature to the temperature at this time step may enable determining how long it took the HVAC system to cool or heat the thermal mass.

A third factor 188 of the thermal model state factors 182 may include the indoor temperature rate. The indoor temperature rate may refer to how quickly the temperature changes when, for example, the HVAC system is off. If the temperature is drifting and the temperature heats exceptionally fast, then the house may be leaking cool air in places. If, however, the indoor temperature drifts reasonably slowly or as expected back to a hotter temperature, then the thermal model may determine the house is not leaking.

A fourth factor 190 of the thermal model state factors 182 may include the current HVAC state. The current HVAC state may refer to whether the HVAC system is on or off. Knowing the current HVAC state may provide guidance in determining whether an alternative HVAC state may provide improved temperature control or whether to keep the HVAC in the same state at the next time step.

A fifth factor 192 of the thermal model state factors 182 may include the number of seconds into the current HVAC state. Knowing the elapsed time in the current HVAC state may enable determining the speed of the HVAC system. For example, if the temperature was 74° F. at the previous time step and the current temperature is 73° F. after the AC has been on for the past 10 minutes, then the thermal model may determine that the HVAC system is slow to cool and can account for that in the predicted temperature.

A sixth factor 194 of the thermal model state factors 182 may include the time of day. Structures heat and cool differently at different times of the day. For example, a house may take longer to cool when the sun is out during the afternoon than when the sun is not present in the middle of the night. Associating the time of day with the other factors may enable more accurate predictions of temperatures resulting from execution of control actions for the same time of day in subsequent calculations.

A seventh factor 196 of the thermal model state factors 182 may include the outdoor temperature. The outdoor temperature may be obtained from an external source such as a web server that provides weather information for the particular geographic location. In some embodiments, the thermal model may take into account weather forecasts obtained from an external source when making the indoor temperature predictions. For example, if a cold front is expected to arrive in the geographic location of the structure, the thermal model may determine that the structure may cool much faster than usual at the time steps when the cold front is expected to be present. Based on the prediction generated by the thermal model, the UCT control may value certain control actions poorly during the cold front, such as turning the AC on prior to or while the cold front is present in the area, thereby avoiding those control actions.

An eighth factor 198 of the thermal model state factors 182 may include the current schedule mode (heat, cool, ranged). The current schedule mode may provide insight to the efficiency of the HVAC system by analyzing what the schedule mode is and the affect that the schedule mode had on the current temperature versus the temperature at the last time step. Further, the wear-and-tear on the HVAC system may be ascertained after sufficient data is collected in conjunction with the other factors.

A ninth factor 200 of the thermal model factors 182 may include the target indoor temperature of the structure being modeled. The target temperature may be a setpoint selected by the user, provided by an external source, or it may be a setpoint generated by a scheduling algorithm. Thus, upcoming setpoint changes may be accounted for and the UCT control may value one control action higher than another if the control action results in a predicted temperature closer to the upcoming setpoint change. In this way, the disclosed techniques enable consideration of upcoming setpoint changes. The target temperature at any given time step may be used to compare to the predicted temperature to derive a temperature error used in the cost function, as described below.

Figure 7:
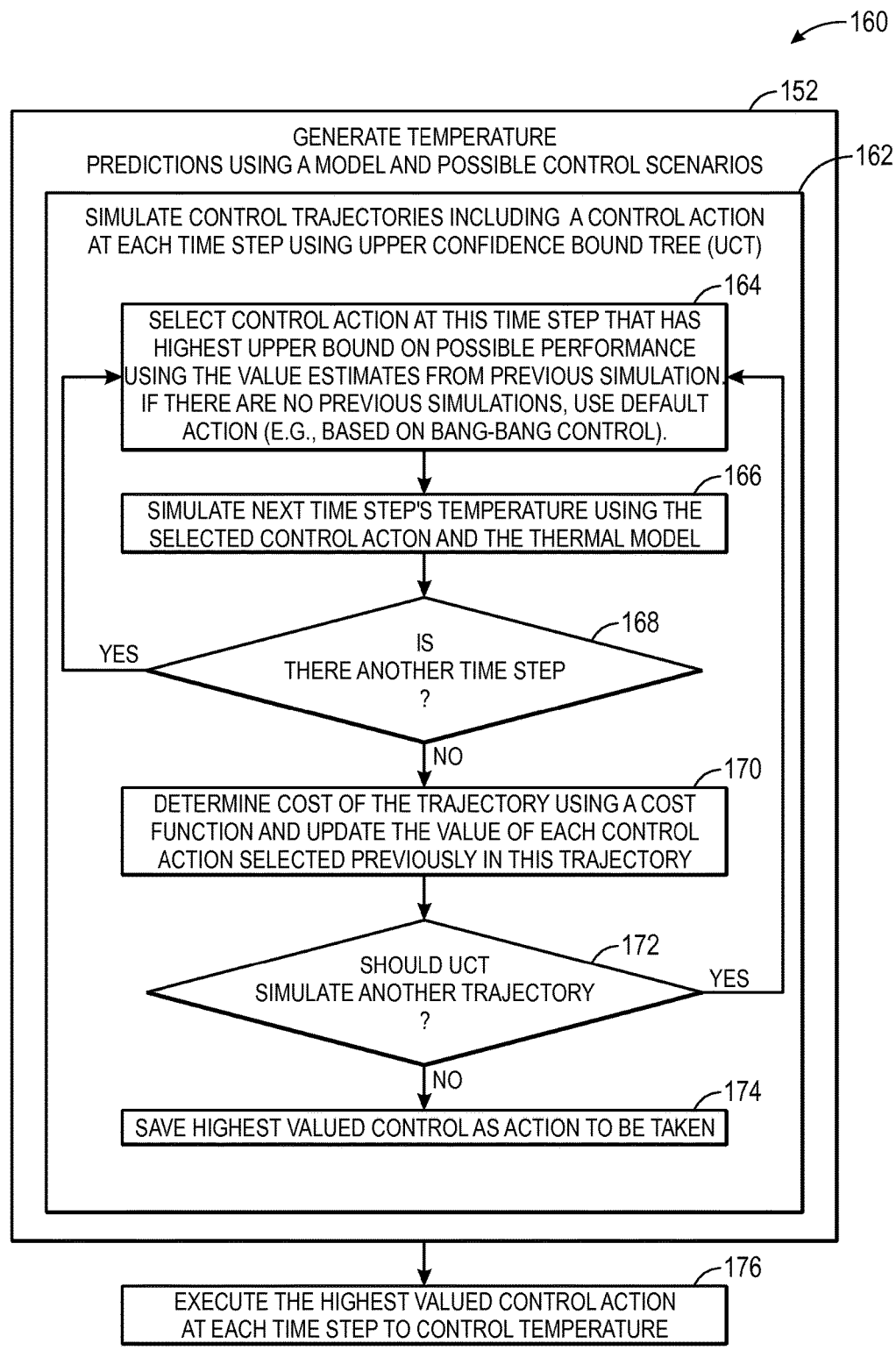
FIG. 7 illustrates a flowchart of a method for controlling an HVAC system using upper confidence bound tree (UCT) control with a model and a cost function, in accordance with an embodiment.
Figure 9:
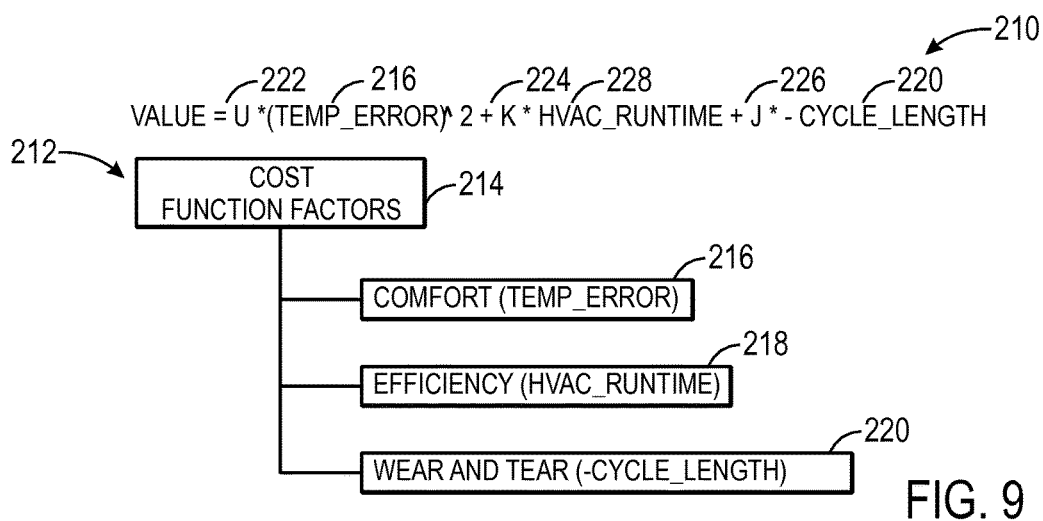
FIG. 9 illustrates the cost function of FIG. 7 and a schematic diagram including the factors analyzed by the cost function, in accordance with an embodiment.

FIG. 9 illustrates the cost function 210 of FIG. 7 and a schematic diagram 212 including the factors 214 analyzed by the cost function 210, in accordance with an embodiment. As previously discussed, the cost function may determine the value of each candidate control trajectory simulated by the predictive control (e.g., UCT control). In some embodiments, it is desirable to maximize the output of the cost function to enhance performance of the HVAC system by trying to find the best fit to the upper confidence bound. In other embodiments, it may be desirable to minimize the output of the cost function to enhance performance of the HVAC system by trying to find the best fit to the upper confidence bound. The cost function may be tailored according to the user's preferences, as described below. As illustrated, the cost function 210 may be expressed as follows:

$$\text{Value}=u*(\text{temp\_error})^2+k*\text{hvac\_runtime}+j*(-\text{cycle\_length})$$

The cost function 210 shown above may be characterized as an equation including three weighted input variables or factors 214 used to compute a value. It should be noted that any number of suitable factors may be utilized depending on numerous factors, such as user preference (e.g., comfort versus efficiency). The first factor 216 of the cost function factors 214, as depicted in the schematic diagram 212, may include the temperature error ("temp_error"), which relates to the temperature comfort level provided by the HVAC system. The second factor 218 of the cost function factors 214 may include the HVAC runtime ("hvac_runtime"), which relates to the efficiency of the HVAC system. The third factor 220 may include the cycle length ("cycle_length"), which relates to the wear-and-tear on the HVAC system and penalizes shorter cycles. As seen in the cost function 210, each factor 216, 218, and 220 may include a weight multiplier. That is, the temp_error factor 216 is multiplied by weight "u" 222, the hvac_runtime factor 218 is multiplied by weight "k" 224, and the num_hvac_cycles factor 220 is multiplied by weight "j" 226.

Each of these weights 222, 224, 226 may be configured based on the user preferences. For example, the user may select temperature comfort is a priority over energy efficiency of the HVAC system. As a result, the weight "u" 222 associated with the comfort factor (temp_error) 216 may be increased to cause the predictive control to attempt to minimize the error between the actual temperature and the setpoint temperature. Likewise, if the user cares less about comfort and more about energy efficiency, the weight "u" 222 associated with the comfort factor (temp_error) 216 may decrease and the weight "k" 224 associated with the efficiency factor (hvac_runtime) 218 may increase. The efficiency factor 218 may penalize running the HVAC excessively. In addition, if the user cares more about reducing the wear-and-tear on the HVAC system by penalizing shorter cycles more heavily, the weight "j" 226 may be increased. The weights may be adjusted accordingly (e.g., by a manufacturer, a developer (e.g., a third-party developer), or a user, or any other entity with suitable interest in the control of the HVAC system) to enable a preferred balance between comfort and efficiency. In other words, when a user selects preferences of the system, the weights are the elements of the cost function that are adjusted accordingly.

The factor 216 may be obtained from the thermal model, and the factors 218 and 200 may be obtained from the candidate control trajectories generated by the predictive control, which may be the UCT control in some embodiments. More specifically, the temperature error factor 216 may be obtained by the thermal model by determining a difference in the predicted temperatures based on selected control actions and the setpoint temperature. The HVAC runtime factor 218 may be obtained by determining an amount of time the HVAC system is running over the period of time simulated in the candidate control trajectories, and the HVAC wear-and-tear factor 220 may be obtained by determining the length of the HVAC cycles present in the candidate control trajectories.

In some embodiments, the cost function 210 may be expressed as follows:

$$\text{Value}=u*(\text{temp\_error})^2+k*\text{hvac\_runtime}+j*(\text{num\_hvac\_cycles})$$

In this embodiment of the cost function, the wear-and-tear factor may include the number of HVAC cycles. This version of the cost function may penalize using more HVAC cycles to inhibit wear-and-tear on the system. It should be noted that this version of the cost function may be used together in conjunction with the version of the cost function that includes cycle length as the wear-and-tear factor. For example, some combination of the weighted cost functions' factors may be used to compute a value.

As previously described, the value that results from the cost function may include a range of values. For example, any suitable range may be used to calculate the upper confidence bounds and lower confidence bounds. The highest value may relate to the highest upper confidence bound on performance, and the lowest value may relate to the lowest confidence bound on performance. Thus, in one example, if a candidate control trajectory generates the highest value, the UCT control may determine that the candidate control trajectory provides the highest valued controls actions to be taken. On the other hand, if a candidate control trajectory generates the lowest value according to the determined bounds, the UCT control may determine that the candidate control trajectory provides the lowest valued control actions and may stop exploring trajectories with similar control actions in future iterations. If a candidate control trajectory generates a value in the middle of the range of values, then the UCT control may determine that there are potentially valuable control actions along that trajectory and keep exploring variations on the set of control actions included in that trajectory in subsequent iterations. It should be noted, that although there is a potential for finding a candidate control trajectory with a set of control actions that generates the highest upper confidence bound, such is not always the case. It should also be noted, that although a candidate control trajectory may appear poorly valued at first by generating a value towards the higher end of the range of values, the UCT control may continue to explore variations on the set of control actions included in that trajectory and potentially find a set of control actions that generate the highest upper confidence bound on performance.

There may be at least two ways to measure the temperature error. In one embodiment, the absolute error between the indoor temperature and the target temperature may be determined, which weights both directions of error equally (e.g., it is too hot or it is too cold). In another embodiment, temperature error may be measured by determining the one-sided temperature error on the side that is less comfortable (e.g., too cold if the HVAC system is heating or too hot if the HVAC system is cooling). As a result, there may not be error attributed when the HVAC system heats too warm (e.g., the predictive control may assume heating when it is too warm is acceptable and that situation may not happen since heating when it is too warm requires more heating, which is inhibited by the efficiency part of the cost function).

Figure 10:
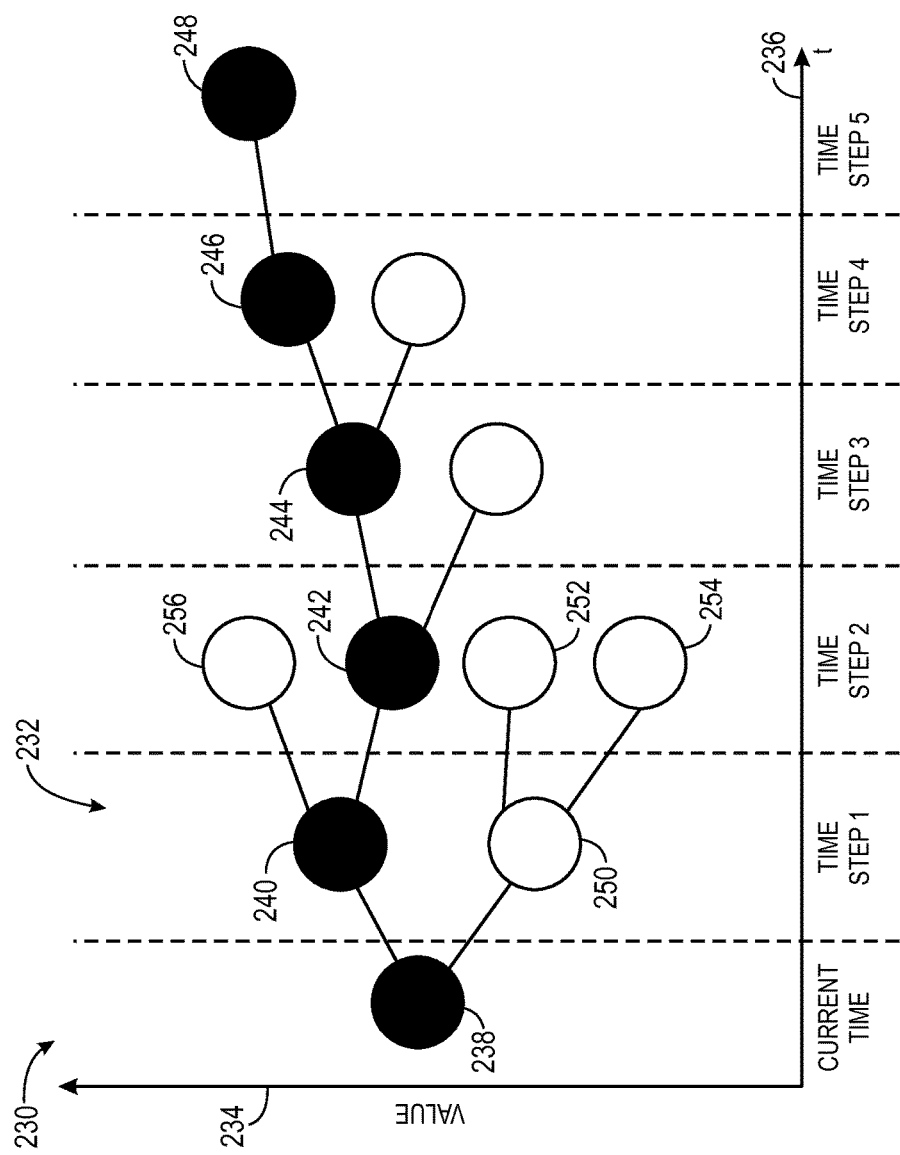
FIG. 10 illustrates a search tree generated by the UCT control of FIG. 7, in accordance with an embodiment.

FIG. 10 illustrates a graph 230 depicting a search tree 232 generated by the UCT control of FIG. 7 that includes candidate control trajectories, in accordance with an embodiment. As depicted, the graph 230 includes value 234 on the y-axis over time 236 on the x-axis. The value 234 for each candidate control trajectory may have been determined by a cost function, as described above, and associated with a control action of the candidate control trajectories at each time step. When the UCT control was initialized, the search tree's root node 238 may have included the current state of the HVAC system at the current time. Most nodes contain two children nodes that each represents a control action, such as turning the HVAC system on or off or keeping the HVAC system on or off. It should be assumed that the user in the described example prefers comfort over energy efficiency, the current temperature was 74.5° F. at the current time with the HVAC recently activated, and there was a temperature setpoint of 74° F.

As depicted, the candidate control trajectory that begins at the root node 238 and consists of the control actions 240, 242, 244, 246, and 248 was selected by the UCT control to apply at time steps 1, 2, 3, 4, and 5, respectively, because the trajectory generated the highest value and, thus, the highest upper confidence bound on performance. As may be seen, there are various other control actions selected at the time steps in different candidate control trajectories that were simulated but did not generate as high of a value as the trajectory selected. Indeed, some of the candidate control trajectories were terminated short of simulating out control actions for all of the time steps because the UCT control determined that their control actions would not result in a valuable set of control actions. Terminating the trajectories short may improve computational efficiency of the UCT control.

To illustrate an example of the termination decision, the candidate control trajectory that includes control actions 250 and 252 and the candidate control trajectory that includes control actions 250 and 254 is discussed in detail below. At time step 1, the UCT control may have selected a first control action 250, such as turning the HVAC system off, in a first candidate control trajectory that produced a value in the lower end of the range of values for that control action 250, because the temperature error would worsen by turning the HVAC off at this time step (e.g., get hotter than 74.5° F.). However, the UCT control may have determined that the value was not so low as to stop exploring this trajectory so the UCT control selected a second control action 252, such as turning the HVAC system on, at time step 2. The second control action 252 may have produced a value slightly higher than the previous value at control action 250 but still in the lower end of the range of values because the control action 252 may have reduced the temperature error between the predicted temperature provided by the thermal model and the setpoint temperature (74° F.). In total, the two control actions 250 and 252 produced values in the lower end of the range of values, and the UCT control may have determined that subsequent control actions may not be beneficial for this trajectory. Nevertheless, the UCT control may have determined that other control actions subsequent to control action 250 at time step 2 may provide higher value. Thus, the UCT control may have selected a second control action 254 at time step 2, such as keeping the HVAC system off, following control action 250 that generated a value even lower in the range of values than control action 252 because the control action 254 may have significantly increased the temperature error. As a result, the resulting value of control actions 250 and 254 produced values even lower in the range of values. The UCT control may have determined that there were no subsequent control actions to control action 250 (turning the HVAC system off at time step 1) that provided a high value on performance of better comfort, and the UCT control may have terminated exploring control actions subsequent to control actions 252 and 254. It should be noted, that in some embodiments, exploration of a trajectory may be stopped if a control action produces a value that lower than a configurable threshold amount or percentage.

Returning to the selected candidate control trajectory, at time step 3, control action 242 has a lower value than control action 256, which may appear to be an incorrect selection. However, as previously discussed, a candidate control trajectory that may appear to be less valuable at the beginning of a trajectory may prove to be more valuable with all of the control actions in the trajectory combined. To illustrate, it may be assumed that the HVAC system is on and cooling the temperature from 74.5° F. to 74° F. in time step 2. At time step 3, the control action 242 may have been to turn the HVAC system off, while control action 256 may have been to keep the HVAC activated. Turning the HVAC system off at this point may have prevented the HVAC system from cooling past 74° F. too far. However, control action 256 (keeping the HVAC system on) may generate a higher value because it would reach 74° F. faster, but the control action 256 may overshoot the target temperature by an additional 0.5° F. or more. Thus, additional control actions (not shown) may produce a higher temperature error in the long run by trying to adjust for the overshoot. Because it was the user's preference to have the HVAC system provide more comfort (e.g. reduced temperature error between actual temperature and the setpoint), the UCT control may determine that control action 242 provides tighter temperature error control in combination with the subsequent control actions in the selected candidate control trajectory by gradually approaching and maintaining a closer fit to the setpoint of 74° F. according to the predicted temperature trajectory provided by the thermal model.

Figure 11:
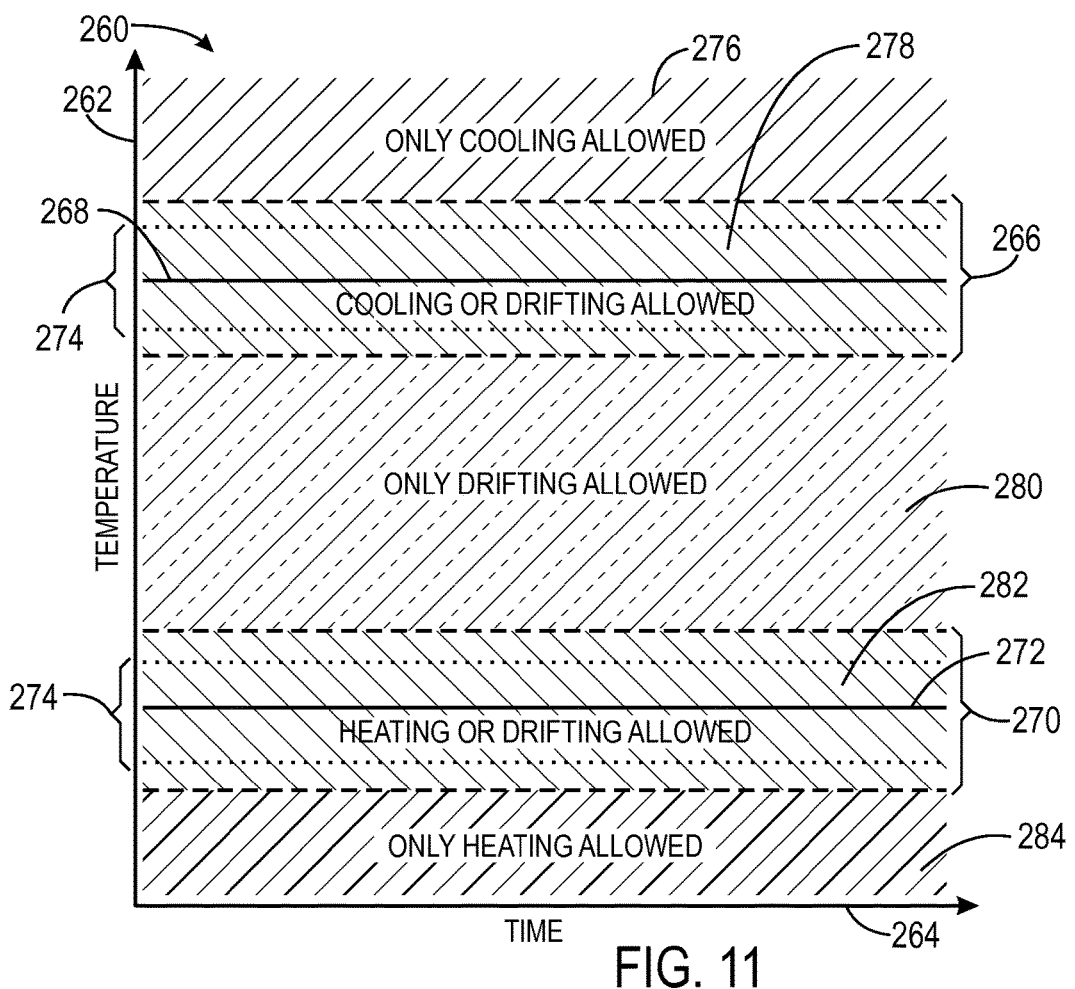
FIG. 11 illustrates a graph of temperature over time including maintenance bands where predictive controlling techniques may be used, in accordance with an embodiment.

There are various planning constraints that may be placed upon the predictive control disclosed herein. For example, FIG. 11 illustrates a graph 260 showing temperature 262 on the y-axis over time 264 on the x-axis including a maintenance band 266 for the upper target temperature 268 and a maintenance band 270 for the lower target temperature 272. The maintenance bands 266 and 270 serve as "playgrounds" for the predictive control to decide which control actions to take at various time steps. However, whenever the temperature 262 exceeds or is outside of the maintenance bands 266 and 270, there is a default action that the predictive control may execute. In some embodiments, the default action is determined based on applying bang-bang control. In this way, the predictive control is limited to changing control actions using the techniques described herein within the maintenance bands 266 and 270. Doing so may ensure the predictive control makes reasonable decisions even if the thermal model is temporarily inaccurate. For example, the constraints force the predictive control to avoid running the AC in an attempt to get the house to drift faster, or to avoid drifting for a few minutes in the expectation that cooling will be sped up.

As may be seen, there is an original maintenance bands 274 that may be used for other control strategies (e.g., bang-bang control), but the maintenance bands 266 and 270 used by the predictive control is X times bigger than the original bands 274. In some embodiments, X may be configurable and set to 1.5. Enlarging the maintenance bands 266 and 270 may enable the predictive control to plan ahead for upcoming setpoint changes and weather changes more efficiently by, for example, pre-cooling, pre-heating, or pre-drifting.

The graph 260 illustrates various regions 276, 278, 280, 282, and 284 where certain activities are allowed. It should be noted that in any region where only cooling or heating is allowed, the predictive control is allowed to choose from all available cooling or heating stages (e.g., stage 1 heat, stage 2 heat, heat pump, auxiliary). In region 276, which is any temperature 262 above the maintenance band 266 upper limit, only cooling is allowed. Thus, if the temperature reaches this region 276, the predictive control may only turn the AC on. In region 278, which is within the maintenance band 266, both cooling or drifting is allowed. For example, when the temperature 262 is above the target temperature 268, cooling may be activated by the predictive control, and when the temperature 262 is below the target temperature 268, the AC may be turned off so drifting occurs to return the temperature closer to the target temperature 268.

In region 280, which includes any temperature 262 below the maintenance band 266 and above the maintenance band 270, only drifting may be allowed. In region 282, which is any temperature 262 within the maintenance band 270, either heating or drifting is allowed. For example, if the temperature 262 is below the lower target temperature 272, the heat may be activated to raise the temperature 262 to meet the lower target temperature 272, or if the temperature is above the lower target temperature 272, the temperature 262 may be allowed to drift back down to the lower target temperature 272. Last, in region 284, which is any temperature 262 below the maintenance band 270, only heating is allowed (any stage). Thus, when the temperature 262 is below the maintenance band 270, the predictive control is inhibited from allowing drifting.

Figure 12:
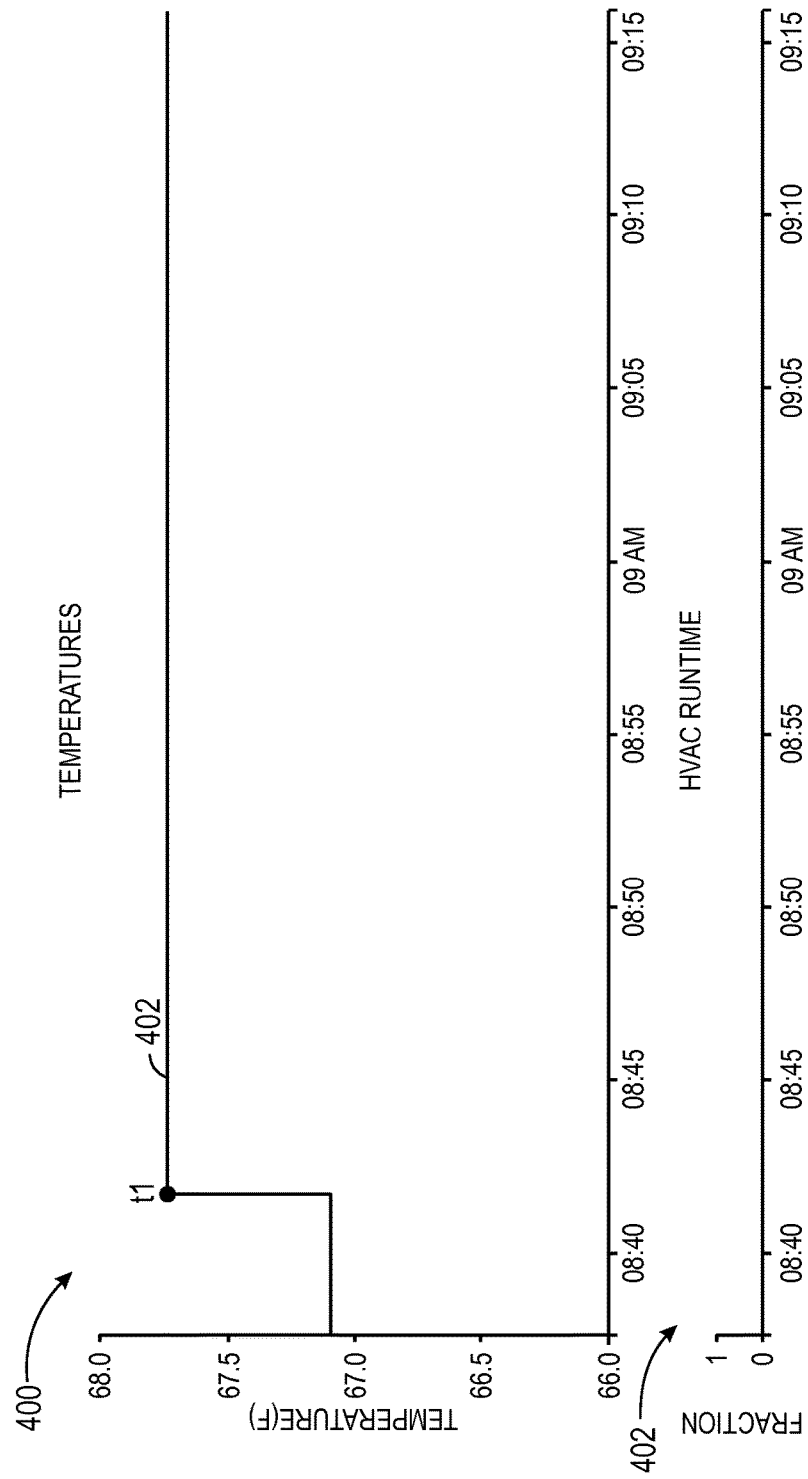
FIG. 12 illustrates a graph using UCT control where the HVAC did not run heating as a result of accounting for outdoor temperature, in accordance with an embodiment.

FIG. 12 illustrates a temperature graph 400 using UCT control where the HVAC system did not run heating, as seen by the HVAC runtime graph 402, by taking into account outdoor temperature, in accordance with an embodiment. The temperature graph 400 shows that there was a setpoint 402 change at t1 from ~67.1° F. to ~67.7° F. However, the UCT control may account for the outdoor temperature and, if the temperature outside is hotter than the indoor temperature, the UCT control may not run heating to save energy. Instead, the UCT control may allow the indoor temperature of the house to drift back towards the target setpoint 402. Thus, the HVAC runtime graph 402 displays no data because the UCT control did not run heating.

Figure 13:
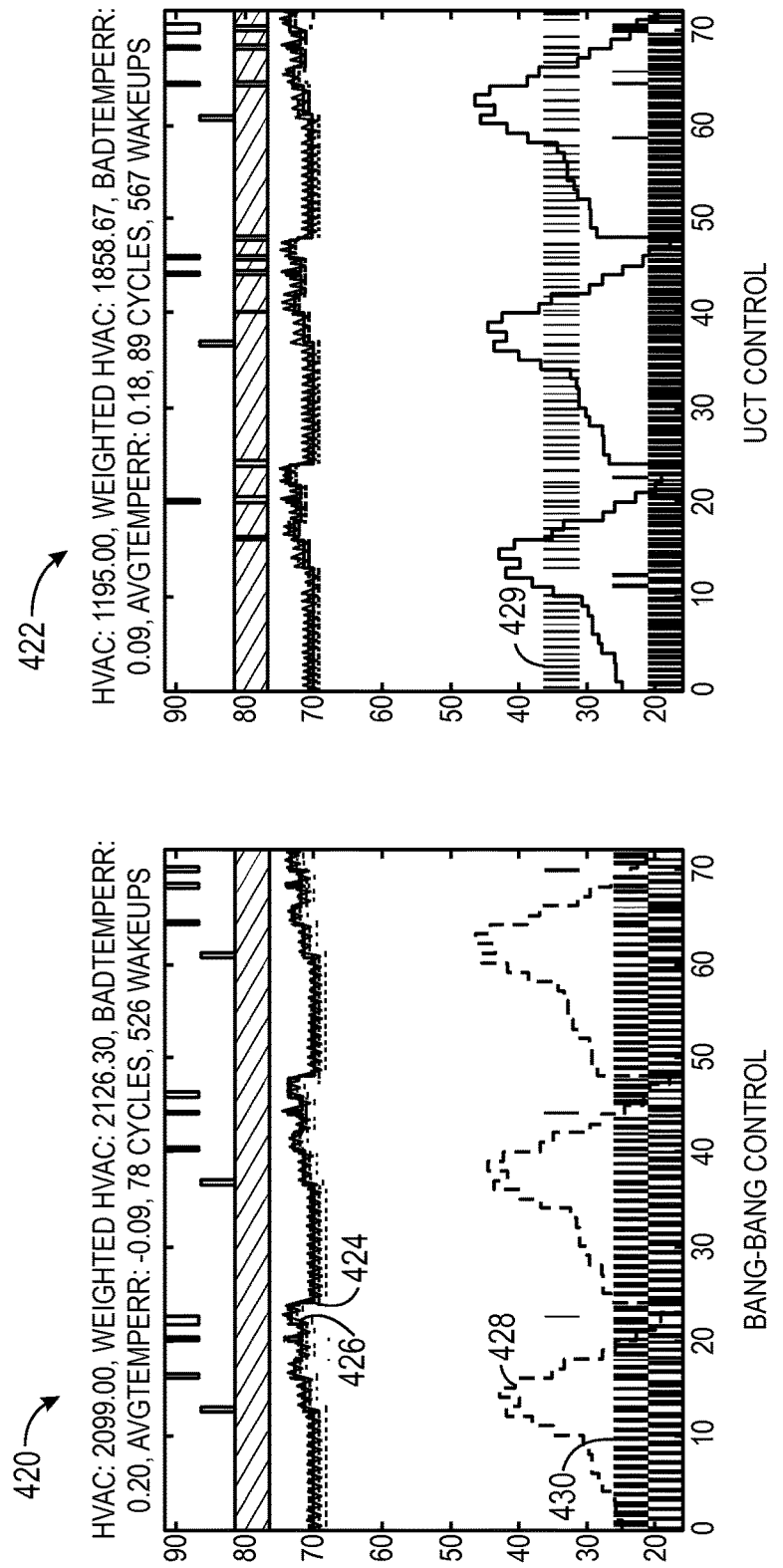
FIG. 13 illustrates comparative graphs showing heating simulations using bang-bang control and UCT control where UCT control results in enhanced efficiency and lower one-sided temperature error, in accordance with an embodiment.
Figure 14:
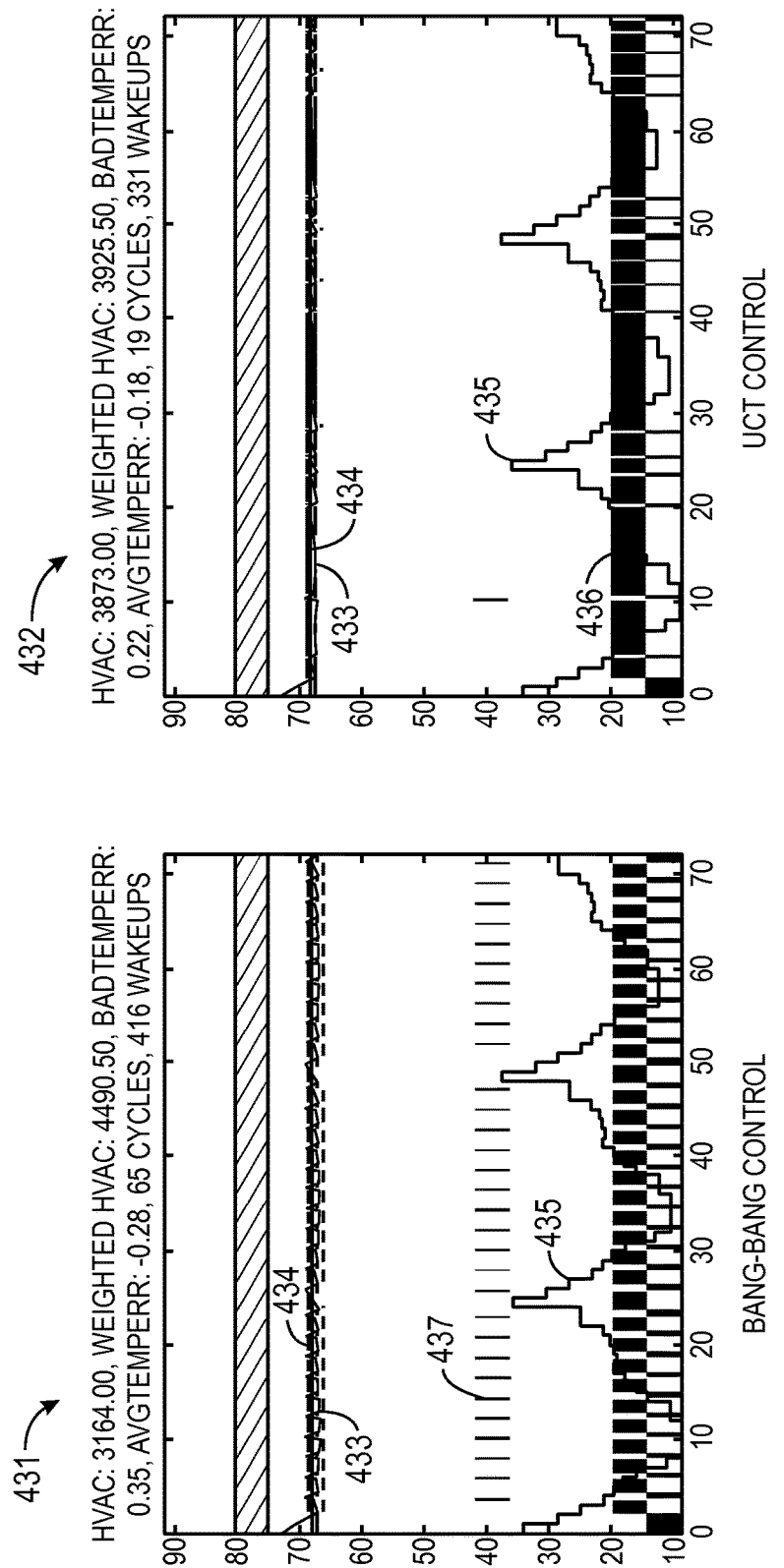
FIG. 14 illustrates comparative graphs showing heating simulations using bang-bang control and UCT control where UCT control results in running heating for longer but enhanced weighted HVAC, average temperature error, and one-sided temperature error.
Figure 15:
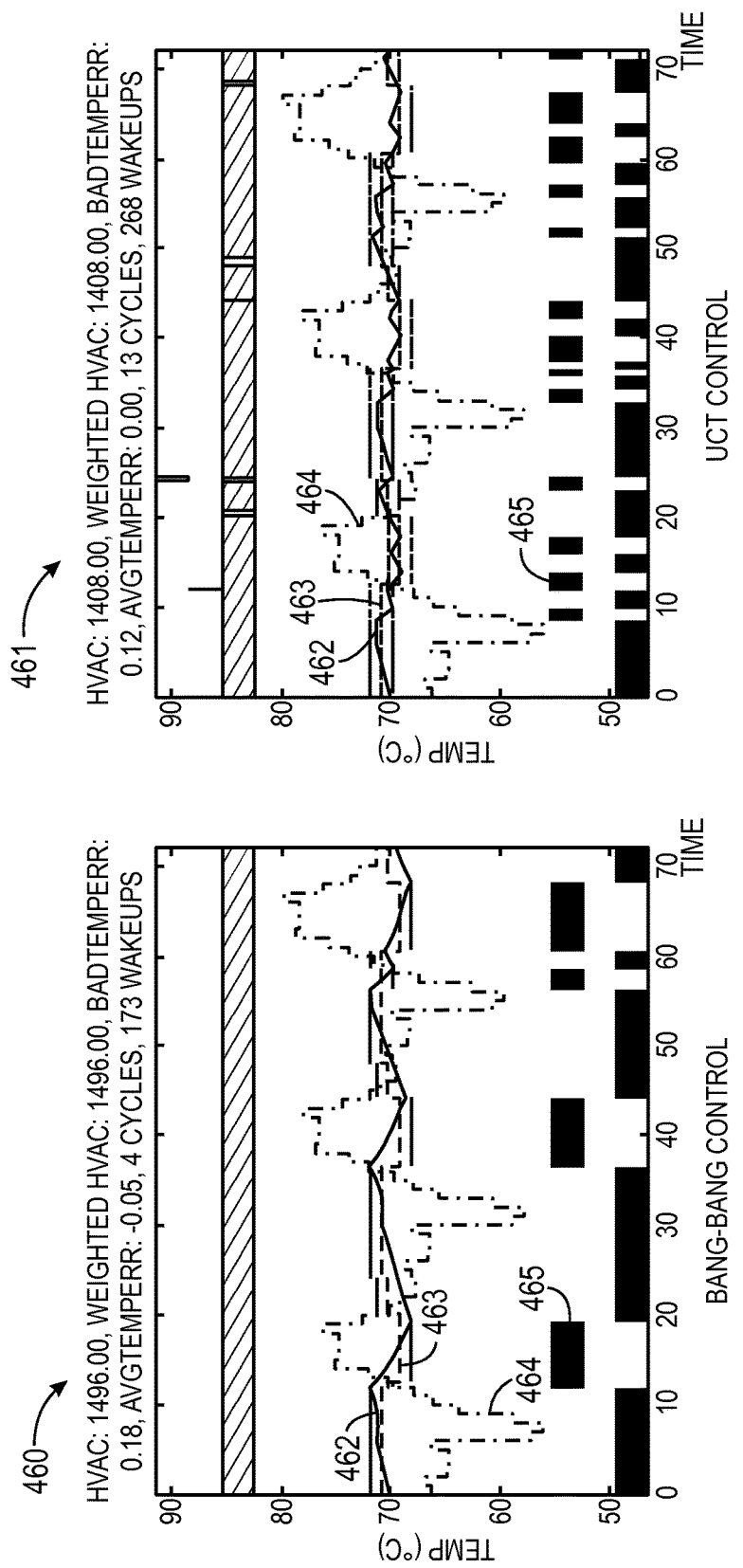
FIG. 15 illustrates comparative graphs showing cooling simulations using bang-bang control and UCT control where UCT control results in enhanced efficiency and lower one-sided temperature error, in accordance with an embodiment.

Simulations comparing the performance of electronic devices 10 using the disclosed predictive control, specifically the UCT control, to devices running the bang-bang control were executed. The results are depicted in FIGS. 13-15. It should be noted that each graph in FIGS. 13-15 represents temperature (° C.) on the y-axis over time on the x-axis. It should also be noted that the values of each candidate control trajectory may be determined by a cost function. The simulations ran for each of FIGS. 13-15 were over the span of 3 days (72 hours on the x-axis). The labels on the top are HVAC (minutes of any type of HVAC stage running), Weighted HVAC (minutes of HVAC weighted by the relative energy costs of running a stage), BadTempErr (average one-sided temperature error in ° C., meaning only if the temperature is on the bad side of the target (e.g., running a heating mode when indoor temperature is too cold), AvgTempErr (average temperature error), cycles (how many HVAC cycles were run), and wakeups (how many times the controller woke up to plan).

Beginning with FIG. 13, graphs are illustrated showing heating simulations using bang-bang control (graph 420) and UCT control (graph 422) where UCT control results in enhanced efficiency and lower one-sided temperature error. Line 424 represents the indoor temperature of the house, line 426 represents the target temperature, and line 428 represents the outdoor temperature. In the depicted embodiment, UCT control used more stage 2 heat cycles 429, whereas bang-bang control used more stage 1 heat cycles 430. Using more stage 2 heat cycles 429 enabled the UCT control to greatly reduce the minutes of HVAC system usage overall (nearly 1000 minutes less). Further, the UCT control produced 1858 minutes of HVAC compared to 2126 minutes for bang-bang control. Also, the UCT control produced a better average temperature error and one-sided temperature error.

FIG. 14 illustrates graphs showing heating simulations using bang-bang control (graph 431) and UCT control (graph 432) where UCT control results in running heating for longer but also results in enhanced weighted HVAC, average temperature error, and one-sided temperature error. Line 433 represents the indoor temperature of the house, line 434 represents the target temperature, and line 435 represents the outdoor temperature. Further, the embodiment depicts an HP+Aux system where the UCT control runs the HP cycles 436 for much longer, which is mostly only able to maintain the temperature, rather than using Aux cycles 437 and then turning off completely like bang-bang control did. As a result, the UCT control runs heating for a lot longer than bang-bang control but the weighted HVAC is significantly less (3925.5 minutes for UCT as opposed to 4490.5 minutes for bang-bang control). In addition, the UCT control provided enhanced comfort by having a better average temperature error and one-sided temperature error.

FIG. 15 illustrates graphs showing cooling simulations using bang-bang control (graph 460) and UCT control (graph 461) where UCT control results in enhanced efficiency and lower one-sided temperature error, in accordance with an embodiment. Line 462 represents the indoor temperature of the house, line 463 represents the target temperature, and line 464 represents the outdoor temperature. The UCT control ran shorter, more frequent cycles 465 compared to bang-bang control, resulting in 1408 minutes of AC rather than 1496 minutes. In addition, the UCT control maintained a lower one-sided temperature error. The processor also woke up much more often using UCT to re-plan (268 wakeups using UCT compared to 173 wakeups using bang-bang), which enabled reducing temperature error and running the HVAC system less. Thus, the UCT control enhanced efficiency and comfort provided by the HVAC system.

Figure 16:
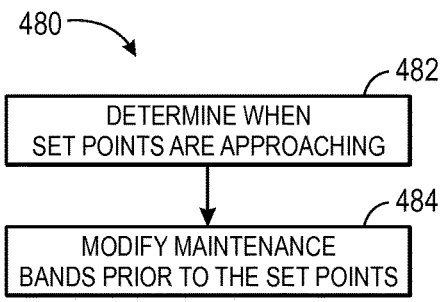
FIG. 16 illustrates a flowchart of a method for modifying maintenance bands based on approaching setpoints, in accordance with an embodiment.

As previously discussed, the predictive control may use constraints to guide the decision making process, such as one or more maintenance bands. In some embodiments, the maintenance bands may be modified and, thus, FIG. 16 illustrates a flowchart of a method 480 for modifying maintenance bands based on approaching setpoints, in accordance with an embodiment. The method 480 may be implemented as computer instructions stored on one or more tangible, non-transitory computer-readable medias (e.g., memory 27) and executable by one or more processors 28. The method 480 may include determining when set points are approaching (process block 482) in a temperature schedule and modifying the maintenance bands around the target setpoints prior to the setpoints (process block 484). Expanding the maintenance bands may enable more room for the predictive control to control the temperature by, for example, pre-cooling the temperature past the old maintenance band threshold in order to prepare for an upcoming setpoint. Therefore, the expanded maintenance bands may enable greater temperature control and improved comfort, among other things.

Figure 17:
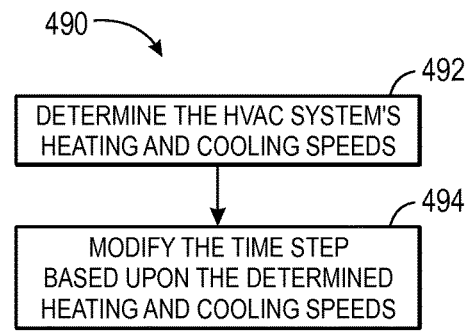
FIG. 17 illustrates a flowchart of a method for modifying time steps based on the heating and cooling speeds of the HVAC system, in accordance with an embodiment.

Further, FIG. 17 illustrates a flowchart of a method 490 for modifying time steps based on the heating and cooling speeds of the HVAC system, in accordance with an embodiment. The method 490 may be implemented as computer instructions stored on one or more tangible, non-transitory computer-readable medias (e.g., memory 27) and executable by one or more processors 28. The method 490 may include determining the HVAC system's heating and cooling speeds (process block 492) and modifying the time steps based upon the determined heating and cooling speeds (process block 494). The time step interval length may provide another constraint to the predictive control because the predictive control may only simulate at the given time steps, and the time steps may be adapted by the speed of the HVAC system. However, the electronic device 10 may wake up and re-plan, and possibly switch HVAC states sooner than the designated time step interval, for example, if the device 10 wakes up for hitting a temperature limit, or for some other reason (e.g., a person walks in front of the device 10).

Thus, if the length of the time step is long, such as 30 minutes, the predictive control may only be able to execute actions every 30 minutes. For an HVAC system that is slow, meaning it takes an extended period of time to get a thermal mass to a certain temperature, extending the time step interval length may be desirable to enable the HVAC system to achieve its setpoint temperature. In contrast, shortening the time step interval length is desirable for a fast HVAC system because the fast HVAC system may achieve the setpoint temperature in a short period of time and the predictive control may be able to select the next control action to provide enhanced comfort and/or efficiency. Thus, it is desirable to determine the HVAC system's speed periodically over time, since HVAC systems may become slower as they are used due to wear-and-tear, and update the time step interval length accordingly.

Figure 18:
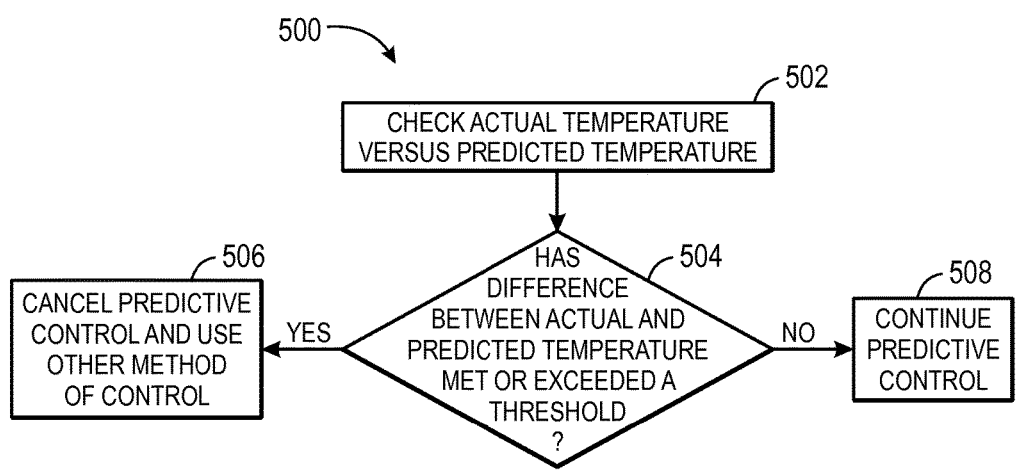
FIG. 18 illustrates a flowchart of a method for altering control strategies based on the difference between the actual temperature and the predicted temperature, in accordance with an embodiment.

FIG. 18 illustrates a flowchart of a method 500 for altering control strategies based on the difference between the actual temperature and the predicted temperature, in accordance with an embodiment. The method 500 may be implemented as computer instructions stored on one or more tangible, non-transitory computer-readable medias (e.g., memory 27) and executable by one or more processors 28. The method 500 may include checking the actual temperature versus the predicted temperature (process block 502), determining whether the difference between the actual and predicted temperatures meets or exceeds a threshold (decision block 504), and, if so, cancelling the predictive control and using another method of control (process block 506). If the difference between the actual and predicted temperatures does not meet or exceed the threshold, then the method 500 may include continuing to use the predictive control's strategy (process block 508).

More specifically, regarding process block 502, the method 500 may check the actual temperature that resulted from a control action versus the predicted temperature that was generated by entering the control action into a model. The check may be performed in real-time to determine whether to cancel using the strategy derived by the predictive control. The check may include determining whether the difference between the actual and the predicted temperatures meets or exceeds a threshold in decision block 504. The threshold may be a configurable degree amount. For example, the threshold difference may be configured to be 0.5°, 1°, 1.5°, 2°, 2.5°, 3°, or any suitable degree amount. In some embodiments, the threshold may be a percentage difference between the actual and predicted temperatures. For example, the threshold percentage difference may be configured to whether the actual temperature is different from the predicted temperature by 1%, 2%, 3%, or any suitable percentage. If the threshold difference is met, then the control strategy derived by the predictive control may be cancelled and another method of control may be initiated, such as bang-bang control (process block 506). If the threshold is not met or exceeded, then the method 500 may continue to use the control strategy derived by the predictive control (process block 508).

Figure 19:
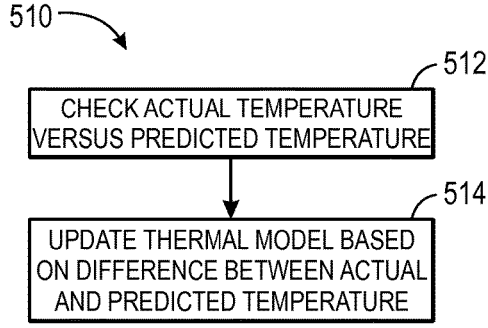
FIG. 19 illustrates a flowchart of a method for updating the thermal model based on the difference between the actual temperature and the predicted temperature, in accordance with an embodiment.

Additionally, FIG. 19 illustrates a flowchart of a method 510 for updating the thermal model based on the difference between the actual temperature and the predicted temperature, in accordance with an embodiment. The method 510 may be implemented as computer instructions stored on one or more tangible, non-transitory computer-readable medias (e.g., memory 27) and executable by one or more processors 28. The method 510 may include checking the actual temperature versus the predicted temperature (process block 512) and updating the thermal model based on the difference between the actual and predicted temperatures (process block 514). As previously discussed, the thermal model may be unique to each person's home or to the structure modeled. That is, each structure may heat or cool differently based on various factors, such as efficiency of the system, wear-and-tear on the system, doors or windows being open, the outdoor temperature, and so forth. Thus, as the factors change in a particular structure, the thermal model may be retrained with a configurable amount of past data to improve accuracy. The retraining may occur at any suitable time. In some embodiments, by default, the thermal model may be retrained once a day at midnight with the configurable amount of past data. The amount of past data may be configured to any suitable amount, but, in some embodiments, may include the past 18 days of data.

In the disclosed method 510, the thermal model may also be updated (e.g., retrained) based on the difference between the actual and predicted temperature (process block 514). If the thermal model predicted a temperature as the result of executing a certain control action and the actual temperature that resulted from executing that control action deviates significantly from the prediction (process block 512), the thermal model may be inaccurate. The amount of difference that triggers updating may be any suitable configurable amount. For example, the threshold difference may be configured to be 0.5°, 1°, 1.5°, 2°, 2.5°, 3°, or any suitable degree amount. In some embodiments, the threshold may be a percentage difference between the actual and predicted temperatures. For example, the threshold percentage difference may be configured to whether the actual temperature is different from the predicted temperature by 1%, 2%, 3%, or any suitable percentage.

Figure 20:
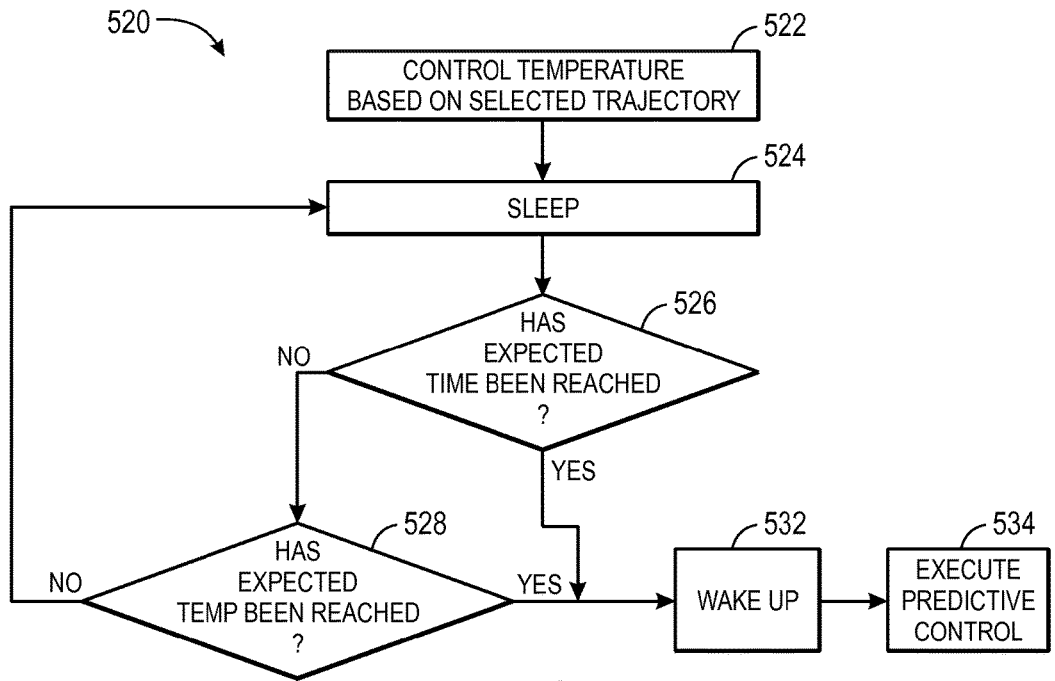
FIG. 20 illustrates a flowchart of a method for an electronic device to determine when to wake up and execute the predictive control, in accordance with an embodiment.

FIG. 20 illustrates a flowchart of a method 520 for the electronic device 10 to determine when to wake up and execute the predictive control, in accordance with an embodiment. The method 520 may be implemented as computer instructions stored on one or more tangible, non-transitory computer-readable medias (e.g., memory 27) and executable by one or more processors 28. As previously discussed, the device 10 may include a high-power processor and a low-power processor. The high-power processor may be used for computationally intensive operations such as executing the predictive control, while the low-power processor may manage less complex processes, such as waking the high-power processor to perform the predictive control.

As such, in the depicted embodiment, the method 520 may include controlling the temperature based on the selected control trajectory using the high-power processor (process block 522) and then having the high-power processor sleep (process block 524). The low-power processor may begin monitoring once the high-power processor sleeps by determining whether an expected amount of time to reach a particular temperature has elapsed (decision block 526). If not, then the low-power processor may determine whether an expected predicted temperature has actually been reached (decision block 528). If either of the decision blocks 526 or 528 result in the answer "yes," then the low-power processor may wake up the high-power processor (process block 532) so that the high-power processor can execute the predictive control (process block 534). However, if all of the decision blocks 526 and 528 result in the answer "no," then the high-power processor may continue to sleep (process block 524), and the low-power processor may continue to perform the monitoring checks.

In some embodiments, where the high-power processor is awaken after an expected time has elapsed and the actual temperature is not equal to the predicted temperature, the high-power processor may determine whether to turn the HVAC system on or keep it on for an additional time step or turn the HVAC system off or keep it off for an additional time step to get the temperature to the desired amount. Whatever decision the high-power processor makes, after the next time step is reached, the high-power processor may recalculate the control strategy via the predictive control.

Figure 21:
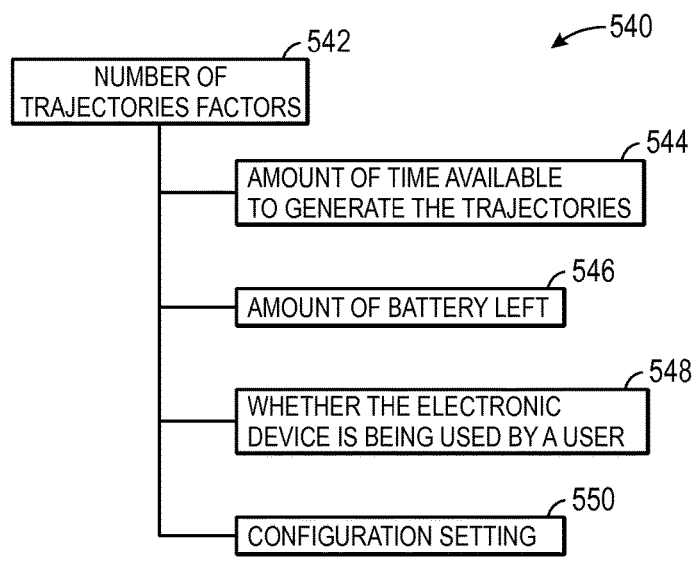
FIG. 21 illustrates a schematic diagram of factors analyzed to determine the number of trajectories to generate for use in the predictive control, in accordance with an embodiment.

FIG. 21 illustrates a schematic diagram 540 of factors 542 analyzed to determine the number of candidate control trajectories to generate for use in the predictive control, in accordance with an embodiment. A first factor 540 of the number of trajectories factors 542 may include the amount of time available to generate the trajectories. As discussed above, the more trajectories that are generated, the more honed the control strategy may be. If there is a substantial amount of time available to calculate a lot of trajectories, then the number of candidate control trajectories may be increased. In some embodiments, the number of candidate control trajectories to generate may be set to 200, 250, 300, or the like. It should be appreciated that any suitable number of candidate control trajectories may be configured. On the other hand, if for some reason there is very little time to perform the predictive control, perhaps the indoor temperature is off from the predicted temperature and the high-power processor was awaken to generate a new control strategy using the predictive control, then the number of candidate control trajectories generated may be reduced (e.g., 25, 50).

A second factor 546 of the number of candidate control trajectories factors 542 may include the amount of battery left. If the amount of battery left is very little (e.g., low battery life), then the number of candidate control trajectories may be reduced. As may be appreciated, calculating a high number of candidate control trajectories may be computationally expensive and may drain the battery. Thus, reducing the number of candidate control trajectories simulated may be less stressful on the battery life, thereby enabling the device 10 to continue functioning after the candidate control trajectories are generated and the highest valued control trajectory is selected to control the temperature.

A third factor 548 of the candidate control trajectories factors 542 may include determining whether the electronic device 10 is being used by a user. That is, if a person selects a setpoint by turning the dial or using an app, the number of candidate control trajectories simulated may be reduced. Reducing the number of candidate control trajectories simulated when a user is using the device 10 may enable the device 10 to be more responsive by freeing up processor 28 bandwidth and also enable the predictive control to take into account the new setpoint in future simulations.

A fourth factor 550 of the candidate control trajectories factors 542 may include applying the configuration settings.

The number of candidate control trajectories to simulate may be set in a configuration setting. Thus, by default, the processor 28 may simulate X number of candidate control trajectories, where X is any suitable number (e.g., 50, 100, 200, 300) set in the configuration settings.

This written description uses examples to disclose the techniques, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A non-transitory computer readable medium storing instructions thereon, the instructions, when executed by a processor of an electronic device, configured to:
   simulate control trajectories to control an environmental control system of a structure for a forthcoming period of time including selecting a control action at each of a plurality of time steps of the forthcoming period of time using upper confidence bound for trees (UCT);
   determine a value of each control trajectory using a cost function and update the value of each control action selected in each control trajectory;
   select a control trajectory with the highest value as the control trajectory to apply to control the environmental control system; and
   control the environmental control system using the selected control trajectory.

2. The computer readable medium of claim 1, wherein selecting the control action at each of the plurality of time steps includes selecting the control action that has the highest upper bound on possible performance using the value from previous simulations.

3. The computer readable medium of claim 2, wherein the instructions are configured to select a default action as the control action for each of the plurality of time steps using bang-bang control if there are no previous simulations.

4. The computer readable medium of claim 2, wherein selecting the control action at each of the plurality of time steps includes predicting temperatures at subsequent time steps that result from applying the selected control action at each of the plurality of time steps using a thermal model of the structure.

5. The computer readable medium of claim 1, wherein the cost function comprises at least three weighted factors related to environmental control system efficiency, temperature comfort level, and environmental control system wear-and-tear.

6. The computer readable medium of claim 5, wherein the weighted environmental control system efficiency factor represents the environmental control system runtime based on the control trajectories, the weighted temperature comfort level represents an error between a target temperature and predicted temperatures derived using a thermal model of a structure, and the weighted environmental control system wear-and-tear factor represents environmental control system cycle length based on the control trajectories.

7. A method, comprising:
   simulating, via a processor, control trajectories to control an environmental control system of a structure for a forthcoming period of time using upper confidence bound for trees (UCT), wherein each control trajectory is simulated by selecting a control action to control the environmental control system at each of a plurality of time steps for the forthcoming period of time based on the highest upper bound on possible performance using rewards from previous simulations;
   determining, via the processor, a reward for each control trajectory;
   selecting, via the processor, a control trajectory with the highest reward as the control trajectory to apply to control the environmental control system; and
   controlling, via the processor, the environmental control system using the selected control trajectory.

8. The method of claim 7, comprising updating the reward of each control action selected in each control trajectory after the reward is determined for each control trajectory.

9. The method of claim 7, comprising predicting a temperature of a next time step using the selected control action at each time step and a thermal model to generate a trajectory of predicted temperatures.

10. The method of claim 7, wherein the reward is determined using a cost function.

11. The method of claim 10, wherein the cost function comprises weighted factors related to environmental control system efficiency, temperature comfort level provided by the environmental control system, and environmental control system wear-and-tear.

12. The method of claim 11, wherein the weights of the factors are adjusted based on user preference.

13. A system, comprising:
   an environmental control system; and
   an electronic device, comprising a processor, the processor being configured to:
      control the environmental control system of a structure by applying a control trajectory, wherein the control trajectory is selected from a plurality of candidate control trajectories simulated using upper confidence bound for trees (UCT) based on having the highest value as determined by a cost function, each of the plurality of candidate control trajectories including a selected control action at each of a plurality of time steps over a period of time and a predicted temperature trajectory resulting from applying each control action at each of the plurality of time steps according to a thermal model of the structure.

14. The system of claim 13, wherein the thermal model includes factors related to a state of the structure comprising target temperature, current indoor temperature, indoor temperature on a previous time step, indoor temperature rate, current environmental control system state, number of seconds into current environmental control system state, time of day, outdoor temperature, current schedule mode, or some combination thereof.

15. The system of claim 13, wherein the processor is configured to determine whether to cancel the applied control trajectory based on whether a measured difference between the predicted temperature trajectory and an indoor temperature exceeds a threshold and, if so, to apply bang-bang control.

16. The system of claim 13, wherein the processor is configured to control the environmental control system according to the control trajectory while an indoor temperature is within a maintenance band surrounding a setpoint temperature and to apply bang-bang control when the indoor temperature exceeds the maintenance band.

17. The system of claim 16, wherein the processor is configured to expand the maintenance band prior to upcoming setpoint changes.

18. The system of claim 13, wherein the thermal model is dynamically generated by the processor and updated at least once a day with historical data, is selected from a number of preloaded thermal models on the electronic device based on a type of structure in which the environmental control system is installed or a geographic location of the structure, is downloaded onto the electronic device from an external server, or some combination thereof.

19. An electronic device, comprising:
a power source configured to provide operational power to the electronic device; and
a processor coupled to the power source, the processor being configured to:
iteratively simulate candidate control trajectories to control an environmental control system of a structure using upper confidence bound for trees (UCT), wherein each candidate control trajectory is simulated by selecting a control action to control the environmental control system at each of a plurality of time steps over a period of time that has the highest upper bound on possible performance using value estimates from previous simulations and predicting a temperature for a next time step of the plurality of time steps that results from applying the selected control action using a thermal model of the structure;
determine a value estimate of each candidate control trajectory using a cost function and update the value estimate of each control action selected in each candidate control trajectory;
select a control trajectory with the highest value using UCT; and
apply the selected candidate control trajectory to control the environmental control system.

20. The electronic device of claim 19, wherein the cost function balances a temperature error between the predicted temperature from the thermal model and a target temperature against the environmental control system runtime based on the candidate control trajectory and the environmental control system cycle length based on the candidate control trajectory.

21. The electronic device of claim 19, wherein UCT is arbitrarily stopped and the selected candidate control trajectory is output based on approximated results.

22. The electronic device of claim 19, wherein a length interval of each time step is determined dynamically based on the efficiency of the environmental control system, wherein the interval length is shorter for more efficient environmental control systems and the interval length is longer for less efficient environmental control systems.

23. A method, comprising:
iteratively simulating candidate control trajectories, via a processor, to control an environmental control system of a structure using upper confidence bound for trees (UCT), wherein each candidate control trajectory is simulated by selecting a control action at each of a plurality of time steps over a period of time that has the highest upper bound on possible performance using value estimates from previous simulations and predicting a temperature for a next time step of the plurality of time steps that results from applying the selected control action using a thermal model;
determining a value estimate of each candidate control trajectory using a cost function and update the value estimate of each control action selected in each candidate control trajectory;
selecting a control trajectory with the highest value using UCT; and
applying the selected candidate control trajectory to control the environmental control system.

24. The method of claim 23, comprising using a default action if there are no previous simulations, wherein the default action is determined using bang-bang control.

25. The method of claim 23, wherein the control trajectory provides improved HVAC efficiency and temperature comfort provided by the environmental control system relative to bang-bang control.

* * * * *